(12) United States Patent
Kloeppner et al.

(10) Patent No.: US 9,766,528 B2
(45) Date of Patent: Sep. 19, 2017

(54) ELECTROCHEMICAL DEVICES WITH PLASTIC SUBSTRATES

(71) Applicant: Gentex Corporation, Zeeland, MI (US)

(72) Inventors: Leroy J. Kloeppner, Jenison, MI (US); William L. Tonar, Holland, MI (US); Gary J. Dozeman, Zeeland, MI (US); Kelvin L. Baumann, Holland, MI (US); Mario F. Saenger Nayver, Zeeland, MI (US); Zachary J. Petroelje, Zeeland, MI (US); Garret DeNolf, Zeeland, MI (US)

(73) Assignee: GENTEX CORPORATION, Zeeland, MI (US)

(*) Notice: Subject to any disclaimer, the term of this patent is extended or adjusted under 35 U.S.C. 154(b) by 0 days.

(21) Appl. No.: 15/065,788

(22) Filed: Mar. 9, 2016

(65) Prior Publication Data

US 2016/0266460 A1 Sep. 15, 2016

Related U.S. Application Data

(60) Provisional application No. 62/130,354, filed on Mar. 9, 2015, provisional application No. 62/135,003, filed
(Continued)

(51) Int. Cl.
*G02F 1/15* (2006.01)
*G02F 1/153* (2006.01)

(52) U.S. Cl.
CPC .... *G02F 1/1533* (2013.01); *G02F 2001/1515* (2013.01); *G02F 2001/1536* (2013.01); *G02F 2201/086* (2013.01); *G02F 2201/501* (2013.01)

(58) Field of Classification Search
CPC ............ G02F 1/1533; G02F 2201/501; G02F 2201/086; G02F 2001/1536; G02F 2001/1515
(Continued)

(56) References Cited

U.S. PATENT DOCUMENTS

| 4,297,401 A | 10/1981 | Chern et al. |
| 4,418,102 A | 11/1983 | Ferrato |

(Continued)

FOREIGN PATENT DOCUMENTS

| WO | WO-98/42796 A1 | 10/1998 |
| WO | WO-99/02621 | 1/1999 |
| WO | WO-2014/025348 A1 | 2/2014 |

OTHER PUBLICATIONS

International Search Report and Written Opinion received in PCT/US2016/021630, dated Jan. 3, 2017 (22 pages).
(Continued)

*Primary Examiner* — Tuyen Tra
(74) *Attorney, Agent, or Firm* — Foley & Lardner LLP; Bradley D. Johnson

(57) ABSTRACT

An electrochromic device includes a first flexible or rigid plastic substrate including a front surface, and a rear surface, wherein the rear surface comprises a first conductive material; and the front surface, the rear surface, or both the front surface and the rear surface of the first substrate comprises a gas diffusion barrier; and a second flexible or rigid plastic substrate including a front surface, and a rear surface, wherein the front surface comprises a second conductive material, wherein the first substrate is joined to the second substrate by a sealing member, where the rear surface of the first substrate and the front surface of the second substrate with the sealing member define a chamber therebetween.

18 Claims, 4 Drawing Sheets or randomize pattern

Related U.S. Application Data on Mar. 18, 2015, provisional application No. 62/184,704, filed on Jun. 25, 2015, provisional application No. 62/257,950, filed on Nov. 20, 2015, provisional application No. 62/258,051, filed on Nov. 20, 2015.

(58) Field of Classification Search
USPC .................................. 359/265–275; 345/105
See application file for complete search history.

(56) References Cited

U.S. PATENT DOCUMENTS

| | | | |
|---|---|---|---|
| 4,695,490 A | 9/1987 | McClelland et al. |
| 4,902,108 A | 2/1990 | Byker |
| 5,140,455 A | 8/1992 | Varaprasad et al. |
| 5,294,376 A | 3/1994 | Byker |
| 5,596,023 A | 1/1997 | Tsubota et al. |
| 5,596,024 A | 1/1997 | Horie et al. |
| 5,770,114 A | 6/1998 | Byker et al. |
| 5,818,625 A | 10/1998 | Forgette et al. |
| 5,888,431 A | 3/1999 | Tonar et al. |
| 5,940,201 A | 8/1999 | Ash et al. |
| 5,998,617 A | 12/1999 | Srinivasa et al. |
| 6,020,987 A | 2/2000 | Baumann et al. |
| 6,057,956 A | 5/2000 | Ash et al. |
| 6,137,620 A | 10/2000 | Guarr et al. |
| 6,157,480 A | 12/2000 | Anderson et al. |
| 6,188,505 B1 | 2/2001 | Lomprey et al. |
| 6,193,912 B1 | 2/2001 | Thieste et al. |
| 6,249,369 B1 | 6/2001 | Theiste et al. |
| 6,268,950 B1 | 7/2001 | Ash et al. |
| 6,597,489 B1 | 7/2003 | Guarr et al. |
| 6,635,194 B2 | 10/2003 | Kloeppner et al. |
| 6,700,692 B2 | 3/2004 | Tonar et al. |
| 6,710,906 B2 | 3/2004 | Guarr et al. |
| 6,714,334 B2 | 3/2004 | Tonar |
| 7,372,609 B2 | 5/2008 | Lin et al. |
| 7,372,611 B2 | 5/2008 | Tonar et al. |
| 7,428,091 B2 | 9/2008 | Baumann et al. |
| 7,830,583 B2 | 11/2010 | Neuman et al. |
| 8,228,590 B2 | 7/2012 | Baumann et al. |
| 8,368,992 B2 | 2/2013 | Neuman et al. |
| 8,599,467 B2 * | 12/2013 | Agrawal ................. B60R 1/088 359/265 |
| 8,928,966 B1 | 1/2015 | Kloeppner et al. |
| 2002/0015214 A1 | 2/2002 | Nishikitani et al. |
| 2002/0048678 A1 | 4/2002 | Hunia et al. |
| 2002/0141032 A1 | 10/2002 | Guarr et al. |
| 2002/0171081 A1 | 11/2002 | Vincent et al. |
| 2003/0039020 A1 | 2/2003 | Lomprey et al. |
| 2005/0162728 A1 | 7/2005 | Warner et al. |
| 2007/0206263 A1 | 9/2007 | Neuman et al. |
| 2008/0310007 A1 | 12/2008 | Agrawal et al. |
| 2011/0003070 A1 | 1/2011 | Pozo Gonzalo et al. |
| 2011/0147680 A1 | 6/2011 | Percec et al. |
| 2012/0032104 A1 | 2/2012 | Amb et al. |
| 2013/0235323 A1 | 9/2013 | Sotzing et al. |

OTHER PUBLICATIONS

International Search Report and Written Opinion received in PCT/US2016/021619, dated Jun. 20, 2016 (32 pages).
International Search Report and Written Opinion received in PCT/US2016/021621, dated Jul. 6, 2016 (18 pages).
Yang, Y. H. et al. Macromol, 2011, 44, 1450-1459.

* cited by examiner or randomize pattern

ELECTROCHEMICAL DEVICES WITH PLASTIC SUBSTRATES

CROSS-REFERENCE TO RELATED APPLICATIONS

This application claims the benefit of U.S. Provisional Patent Application No. 62/130,354, filed on Mar. 9, 2015; 62/135,003, filed on Mar. 18, 2015; 62/184,704, filed on Jun. 25, 2015; 62/257,950, filed on Nov. 20, 2015; and 62/258,051, filed on Nov. 20, 2015; the entire disclosures of which are incorporated herein by reference for any and all purposes.

FIELD

The present technology is generally related to electrochromic devices. More particularly, it is related to electrochromic devices having at least one plastic substrate.

SUMMARY

In one aspect, an electrochromic device includes a first flexible or rigid plastic substrate and a second flexible or rigid plastic substrate. The first flexible or rigid plastic substrate includes a front surface and a rear surface, where the rear surface includes a first conductive material, and the front surface, the rear surface, or both the front surface and the rear surface of the first substrate includes a gas diffusion barrier. The second flexible or rigid plastic substrate includes a front surface and a rear surface, wherein the front surface includes a second conductive material. Over, in the device, the first substrate is joined to the second substrate by a sealing member, where the rear surface of the first substrate and the front surface of the second substrate with the sealing member define a chamber therebetween. In some embodiments, the front surface, the rear surface, or both the front surface and the rear surface of the second substrate include a gas diffusion barrier. In any of the above embodiments, the chamber may include an electrochromic medium including a cathodic material and an anodic material. In any of the above embodiments, the first conductive material may include a conductive nanowire coating, a conductive metal mesh, an insulator/metal/insulator stack (IMI stack), a transparent polymer filled with nanoparticles (such as indium tin oxide particles), carbon nanotubes, graphene, or a conductive polymer. In any of the above embodiments, the second conductive material may include a conductive nanowire coating, a conductive metal mesh, or an IMI stack. In some embodiments, additional conductive coating may overlay either or both of the first or second conductive metal meshes or conductive nanowire coating.

In any of the above embodiments, the sealing member may include a thermally-curable seal, an ultraviolet-curable seal, a hot melt using a third thermal plastic, a weld, a pressure sensitive adhesive (PSA), or a heat seal film holding the first substrate to the second substrate.

In any of the above embodiments, the chamber may include a first polymer-based electrochromic film. In any embodiment descried herein, the polymer-based electrochromic films may be cross-linked electrochromic films or thermoplastic electrochromic films. In any of the above embodiments, the first polymer-based electrochromic film may include a first electroactive material and a first thermoplastic polymer. In any of the above embodiments, the first electroactive material is a cathodic material, and anodic material, or a mixture of a cathodic material and an anodic material.

In any of the above embodiments, the chamber may include a second polymer-based electrochromic film. The polymer-based electrochromic films may be cross-linked electrochromic films or thermoplastic electrochromic films. The polymer-based electrochromic film may include a second electroactive material and a second thermoplastic polymer. In any of the above embodiments, where the device includes both first and second polymer-based electrochromic film (e.g., thermoplastic electrochromic films), the films may be separated by an electrolyte layer. The electrolyte layer may incorporate a porous membrane or an ion-exchange membrane capable of ion transport.

In another aspect, an electrochromic device includes a first flexible or rigid plastic substrate having a first surface and a second surface, a second flexible or rigid plastic substrate having a first surface and a second surface; and a sealing member, joining the second surface of the first substrate to the first surface of the second substrate forming a chamber therebetween. In the device, a surface or both surfaces of the first substrate is coated with, or the substrate is impregnated with, an ultraviolet light absorbing layer or material, the second surface is coated with a conductive material and a first polymer-based electrochromic film including an anodic material, and the chamber includes a fluid medium containing a UV-curable or thermally-curable gelling agent. In some embodiments, the fluid medium further includes a cathodic material. In any of the above embodiments, the fluid medium may further include an ultraviolet absorbing material. In some embodiments, the first surface of the second substrate is coated with a second polymer-based electrochromic film including a cathodic material. In other embodiments, the first surface of the second substrate is coated with a conductive coating. The sealing member may include a UV-curable resin, a thermal cure resin, a hot melt plastic, a PSA, a heat seal film, or a weld between the first substrate and the second substrate.

In another aspect, an electrochromic device includes a first flexible or rigid plastic substrate and a second flexible or rigid substrate. In the device, the first flexible or rigid substrate includes a front surface and a rear surface having a conductive nanowire coating, a conductive metal mesh, an IMI stack, a transparent polymer filled with nanoparticles (such as indium tin oxide particles), carbon nanotubes, graphene, or a conductive polymer, where the front surface, the rear surface, or both the front surface and the rear surface of the first substrate has a gas diffusion barrier. The conductive wire mesh or the conductive nanowire coating can be coated with another conductive coating. In the device, the second flexible or rigid plastic substrate includes a front surface having a conductive nanowire coating, a conductive metal mesh, an IMI stack, a transparent polymer filled with nanoparticles (such as indium tin oxide particles), carbon nanotubes, graphene, or a conductive polymer, and a rear surface, where the first substrate is joined to the second substrate by a sealing member, and the rear surface of the first substrate and the front surface of the second substrate with the sealing member define a chamber therebetween. In some embodiments, the second substrate is a plastic substrate and the front surface, the rear surface, or both the front surface and the rear surface of the second substrate include a gas diffusion barrier. The substrates may include an additional coating that absorbs UV light or a UV absorbing material may be incorporated into the substrate. In any of the above embodiments, the chamber includes an electrochromic medium including a cathodic material and an anodic material. In any of the above embodiments, the rear surface of the first substrate includes a conductive nanowire coating, a conductive metal mesh, an IMI stack, a transparent polymer filled with nanoparticles (such as indium tin oxide particles), carbon nanotubes, graphene, or a conductive polymer; and the front surface of the second substrate comprises a conductive nanowire coating, a conductive metal mesh, an IMI stack, a transparent polymer filled with nanoparticles (such as indium tin oxide particles), carbon nanotubes, graphene, or a conductive polymer. In any of the above embodiments, the rear surface of the first substrate and the front surface of the second substrate each include a conductive coating disposed between the conductive material and the chamber. In any of the above embodiments, the first surface of the first substrate and/or the second surface of the second substrate include a scratch-resistant coating. Additional coatings applied to a surface may include, but are not limited to, an anti-reflection coating and/or an anti-smudge or anti-fingerprint coating.

In another aspect, a process is provided for forming a substrate for an electrochromic device. The process includes coating a surface of a first flexible or rigid plastic substrate with a first polymer-based electrochromic film. The first polymer-based electrochromic film has at least one first electroactive material and a first thermoplastic polymer, the first surface further including a conductive nanowire coating, a conductive metal mesh, an IMI stack, a transparent polymer filled with nanoparticles (such as indium tin oxide particles), carbon nanotubes, graphene, or a conductive polymer, and a gas barrier coating on a second surface of the first flexible or rigid plastic substrate. The conductive nanowire coating or conductive metal mesh may be further coated with an additional conductive coating. In some embodiments of the process, the coating is applied using slot die coating, ink jet printing, screen printing, gravure coating, curtain coating, spray coating, dip coating, extrusion coating, or slide coating. In any of the above embodiments, the process also includes joining the surface of the first substrate including the first polymer-based electrochromic film to a first surface of a second substrate with a sealing member, and forming a chamber therebetween. In any of the above embodiments, the process also includes coating the first surface of the second substrate with a second polymer-based electrochromic film, the second electrochromic film including at least one second electroactive material and a second thermoplastic polymer. In any of the above embodiments, the process may also include filling the chamber with a fluid or gel electrolyte medium. The fluid medium may be subsequently gelled or solidified in situ.

In another aspect, an electrochromic device includes a flexible substrate including a front surface; and a rear surface; wherein: the rear surface comprises a first conductive material; and the front surface, the rear surface, or both the front surface and the rear surface of the first substrate comprises a gas diffusion barrier; a rigid substrate including a front surface; and a rear surface; wherein: the front surface comprises a second conductive material; wherein: the flexible substrate is shape conforming to the rigid substrate; the flexible substrate is joined to the rigid substrate by a sealing member, where the rear surface of the flexible substrate and the front surface of the rigid substrate with the sealing member define a chamber therebetween.

In another aspect, an electrochromic device includes a rigid substrate including a front surface; and a rear surface; wherein: the rear surface comprises a first conductive material; and the front surface, the rear surface, or both the front surface and the rear surface of the first substrate comprises a gas diffusion barrier; a flexible substrate including a front surface; and a rear surface; wherein: the front surface comprises a second conductive material; wherein: the flexible substrate is shape conforming to the rigid substrate; the flexible substrate is joined to the rigid substrate by a sealing member, where the rear surface of the flexible substrate and the front surface of the rigid substrate with the sealing member define a chamber therebetween.

DETAILED DESCRIPTION

Figure 1:
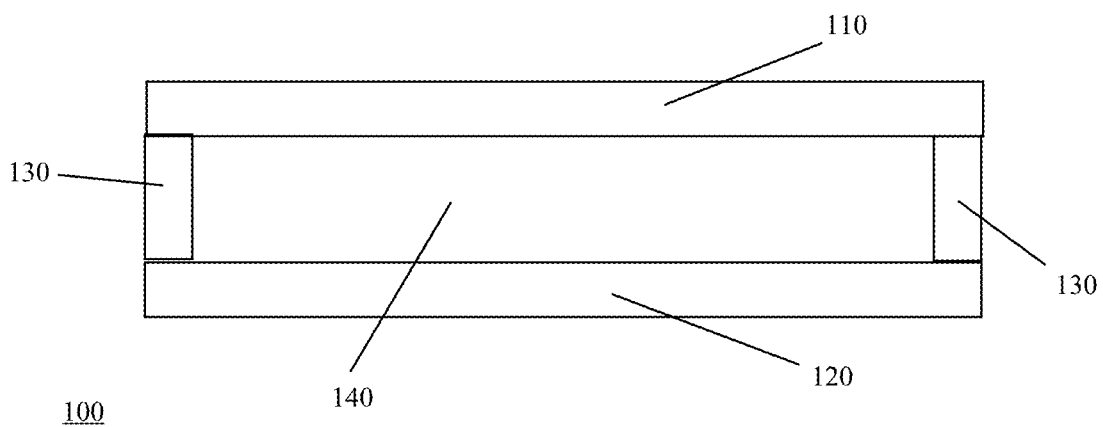
FIG. 1 is a schematic cross-section drawing of an electrochromic device, according to some embodiments.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

The term "substantially transparent" as used herein will be understood by persons of ordinary skill in the art and will vary to some extent depending upon the context in which it is used. If there are uses of the term which are not clear to persons of ordinary skill in the art, given the context in which it is used, the term means that the material allows a light transmission of about 75% or more of a beam of light having a wavelength of 400 nm directed to the material at a specular angle of 10° through a thickness of 2 mm of the material.

Electrochromic devices having plastic substrates have been desired for many years. The present inventors provide herein a number of solutions to problems that have plagued the implementation of plastic substrate electrochromic devices. Such problems include, but are not limited to, oxygen incursion, unavailability of low resistance conductive coatings, ability to cure materials using ultraviolet (UV) light, electrochromic films that will flex with the substrate, and methods of making such materials and devices.

The electrochromic devices described herein include at least one chamber defined by a first substrate having a first conductive surface, a second substrate having a second conductive surface, and a sealing member joining the first substrate to the second substrate with the first and second conductive surfaces contacting at least a portion of the sealing member. Within the chamber defined therein, an electrochromic medium may be disposed, the electrochromic medium providing for a color change of the device upon application of a potential to one or both of the conductive surfaces. As used herein, the electrochromic medium may contain at least a cathodic material (i.e. a material that is reducible), an anodic material (i.e. a material that is oxidizable), or a mixture of a cathodic material and an anodic material. The electrochromic medium may be solid state, solution phase, a gel, or a polymer-based material such as a thermoplastic material or a cross-linked material. One or both of the cathodic and anodic materials may be confined to one or both of the first and second substrates. In some embodiments, where one or both of the cathodic and anodic materials are surface confined, the anodic material may be sequestered on the first or second conductive surface and the cathodic material may be sequestered on the second or first conductive surface. The electrochromic medium may also contain an electrolyte to facilitate charge movement from one electrode to the other. The first and second substrates may be off-set to one another to allow for electric contact to be made with the first and second conductive surfaces.

Because these are electrochromic devices, it is understood that when a sufficient potential is applied to the device, the electrochromic medium or coatings undergo a change in transmission. The change in light transmission may be the result of a color change in the medium or coating such that oxidation and reduction of the anodic and cathodic species changes the absorption of the medium or coating, resulting in a reduction in transmission upon application of the potential. Release of the potential may result in maintenance of the reduced transmission state when the anodic and cathodic materials are confined with respect to movement through the chamber, or release of the potential may result in an increase in transmission if the anodic and cathodic materials are allowed to migrate through the chamber or if the reduced cathodic and oxidized anodic are not held separated in the chamber. Shorting of the device after application of a potential may speed the time necessary for the transmission state to return to the original, pre-potential light transmission. Momentarily reversing the applied potential may also speed the change in transmission from low light transmission to high light transmission.

Figure 2:
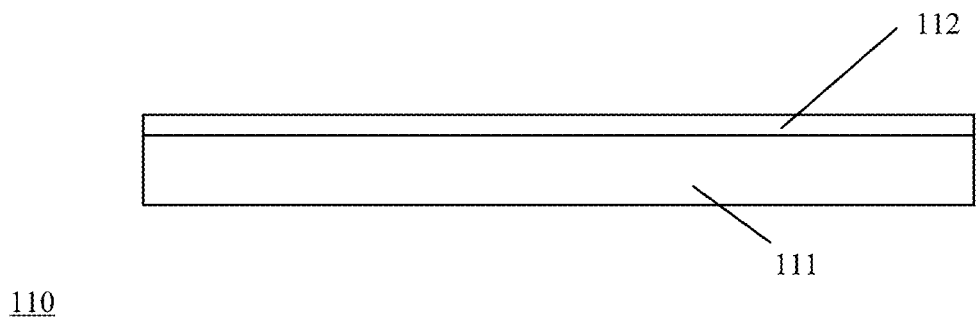
FIG. 2 is a schematic drawing of a substrate having a conductive layer on one surface, according to some embodiments.

Referring generally to FIG. 1, an electrochromic is provided. The device 100 has a first substrate 110 and a second substrate 120, each substrate having a front surface and a rear surface. The first substrate 110 will be joined to the second substrate 120 by a sealing member 130 such that a chamber is formed. The chamber is defined by the rear surface of the first substrate 110, the front surface of the second substrate 120, and an inner surface of the sealing member 130. As illustrated in FIG. 2, the rear surface of the first substrate 110 may include a first conductive material 112. The device may be a mirror, where the first substrate is substantially transparent and the second substrate is a mirrored substrate, with the front or rear surface being the mirrored surface. The device may also be a window, such as an architectural window, car window, or aircraft window, where both substrates are substantially transparent. The device may also be a light filter. The device may also be an eyewear lens. The devices may also be mirrored, moderately transparent, or substantially transparent, flexible or rigid electrochromic devices for any other particular application.

Gas Diffusion Barrier

In the device, the front surface, the rear surface, or both the front and rear surfaces of the first substrate include a gas diffusion barrier. The gas diffusion barrier is a barrier to incursion of gas, such as oxygen or water vapor, into the device. Thus, the gas diffusion barrier prevents, or at least limits, gas from entering the devices. Where the second substrate is made of a material (vide infra) that is permeable, the front surface, the rear surface, or both the front and rear surface of the second substrate may also include a gas diffusion barrier. It is preferred to have the gas barrier on the substrate surface that is closest to the electrochromic media. For example, the back surface of the first substrate and/or the front surface of the second substrate.

Wherever a gas diffusion barrier is employed in the device, the gas diffusion barrier may minimize or prevent the incursion of the gas into the device. For example, where the gas to be excluded by the diffusion barrier is oxygen, the gas diffusion barrier prevents, or at least minimizes, the incursion of oxygen into the device. Where the gas to be excluded is water vapor, the gas diffusion barrier prevents, or at least minimizes, the incursion of water into the device. In some embodiments, the gas diffusion barrier is a barrier to a single gas, while in other embodiments, the gas diffusion barrier is a barrier to multiple gases. This may be provided by a single layer gas diffusion barrier or multiple layer gas diffusion barriers. For an electrochromic device the substrate and gas barrier should have an oxygen transmission rate that is less than $10^{-2}$ $cm^3/m^2$/day atm. This may include less than $10^{-3}$ $cm^3/m^2$/day atm and less than $10^{-4}$ $cm^3/m^2$/day atm Illustrative gas diffusion barriers may include a polymer and/or inorganic film(s) that is applied to the substrate, layer(s) applied to the substrate by physical vapor deposition such as vacuum evaporation or sputtering, plasma-enhanced chemical vapor deposition (PECVD); layer(s) applied by atomic layer deposition (ALD); or layer(s) applied to the substrate by neutral beam assisted sputtering (NBAS). Illustrative barrier films may include, but are not limited to, those of $Al_2O_3$, $Si_3N_4$, SN, TiN, $SiO_xN_y$, indium tin oxide (ITO), $SiO_2$, $ZnO_2$, or $TiO_2$, where x and y are from greater than 0 to 4. Where the gas diffusion layer is a polymer; illustrative polymers may include, but are not limited to, a polyimide, a polyester (such as polyethylene terephthalate (PET) and/or polyethylene naphthalate (PEN)), a cycloolefin copolymer (COC), a cycloolefin polymer (COP), a poly(ethylene-co-vinyl alcohol) (EVOH), acrylates, methacrylates, a polyvinyl alcohol (PVOH), Saran® (PVDC), Saranex® (HDPE, EVA, and PVDC), epichlorohydrin, Barex® (an acrylonitrile copolymer). Other illustrative barriers include films of self-assemble nanoparticles (SNAPs), multilayer mixed organic and inorganic thin films, such as, but not limited to, Vitex® barrier systems, Fujifilm barriers, and 3M barriers. The Vitex system is a film of alternating layers of DC reactive sputtered aluminum oxide and vapor deposited organic monomers that are UV-cured. Fujifilm and 3M systems are similar to the Vitex, in that they are alternating films of inorganic and polymer films. The multilayer barrier films are generally composed of alternating organic (usually acrylates) and inorganic (metal oxides or nitrides) layers (dyads) on a polyethylene terephthalate or polyethylene naphthalate substrate. Commercially available barrier films generally have 2 to 3 dyads and a protective topcoat. Another illustrative barrier system is alternating thin films of cationic and anionic polymers deposited by layer-by-layer deposition techniques, as illustrated by reference: Yang, Y. H. et al. Macromol, 2011, 44, 1450-1459. Another illustrative barrier film includes a flexible, thin glass films (less than 0.5 mm thick) applied to the plastic substrate. The thin glass may be adhered to the plastic substrate using liquid optical coupling adhesives or laminated using optically clear pressure sensitive adhesives. An example of a suitable flexible, thin glass film includes, but is not limited to, Willow® glass available from Corning Inc. (Corning, N.Y.).

Substrates

In the device, at least the first substrate is a plastic substrate. The plastic substrate may be a polymeric substrate that includes, but is not limited to, polyethylene (both low and high density), polyethylene terephthalate (PET), polyethylene naphthalate (PEN), polycarbonate (PC), polysulfone, acrylic polymers including, but not limited to polymethylmethacrylate (PMMA), polymethacrylates, polyamides including, but not limited to, a cycloaliphatic diamine dodecanedioic acid polymer (i.e. Trogamid® CX7323), epoxies, cyclic olefin polymers (COP) such as Zeonor 1420R, cyclic olefin copolymers (COC) such as Topas 6013S-04 or Mitsui Apel, polymethylpentene, cellulose ester based plastics like cellulose triacetate, and polyacrylonitrile. With regard to the second substrate, it may be a plastic substrate of the same, or a different polymeric material than the first substrate. Where both the first and second substrates are plastic substrates, they may be flexible or rigid substrates such that the electrochromic device formed therefrom is a flexible or rigid electrochromic device.

One issue that is prevalent with transparent conductive oxide (TCO) coatings on a plastic substrate is the inability to achieve a sufficiently low sheet resistance for an electrochromic device. The rear (or second) surface of the first substrate and the front (or first) surface of the second substrate include a conductive material. Where the second substrate is a metal, the sheet resistance is sufficiently low, however for the first substrate, which is a substantially transparent substrate, the rear surface includes a conductive material to provide a conductive surface on the substrate. For example, the conductive material may be a TCO such as indium tin oxide (ITO), indium zinc oxide (IZO), zinc oxide, and tin oxide. However, where flexibility is to be exhibited by at least the first substrate, and particularly where both substrates are flexible or rigid, indium tin oxide is quite brittle and may not survive repeated flexing. Accordingly, in the present technology the conductive material may be a conductive nanowire coating or conductive metal mesh material that has dimensions such that it does not substantially affect the reflection in the case of a mirror or the transparency in the case of a window. For example, the mesh or nanowire coating may have a transmission that is greater than 50%. In any of the above embodiments, the mesh may have a transmission that is greater than 60%, greater than 70%, greater than 80%, or greater than 90%. The conductive material may also be an insulator/metal/insulator stack (an "IMI stack") such as those disclosed in U.S. Pat. Nos. 7,830,583 and 8,368,992. The insulator may be a TCO such as ITO and the metal may be a conductive metal such as silver. Such structures are able to obtain a sheet resistance of 5 to 9 $\Omega$/sq while having a transmission higher than 80% and a thickness lower than 110 nm, which is much smaller than an ITO coating on plastic having 5 $\Omega$/sq at 860 nm thickness. Further, the mesh, nanowire coating, and or IMI stack may have a sheet resistance of less than 50 $\Omega$/sq. This may include a sheet resistance of less than 10 $\Omega$/sq, less than 1 $\Omega$/sq, less than 0.5 $\Omega$/sq, less than 0.2 $\Omega$/sq, less than 0.1 $\Omega$/sq, less than 0.05 $\Omega$/sq, or less than 0.01 $\Omega$/sq. In any of the above embodiments, the mesh may have a sheet resistance of from about 0.0001 $\Omega$/sq to about 50 $\Omega$/sq. This may include meshes, nanowire coatings, and IMI stacks having a sheet resistance from about 0.0001 $\Omega$/sq to about 10 $\Omega$/sq, from about 0.0001 $\Omega$/sq to about 5 $\Omega$/sq, from about 0.0001 $\Omega$/sq to about 1 $\Omega$/sq, from about 0.001 $\Omega$/sq to about 10 $\Omega$/sq, and from about 0.001 $\Omega$/sq to about 1 $\Omega$/sq. A brittle TCO such ITO may be coated (either undercoated, overcoated, or both) with a more flexible conductive film like a conductive polymer or a transparent polymer filled with conductive nanoparticles (such as ITO nanoparticles) to make it more resistant to substrate flexing. If cracks develops in the brittle TCO the flexible conductive film will electrically bridge the gap and maintain conductivity in the damaged area.

One problem with coatings on plastic substrates, in particular on substrates that tend to be chemically inert, such as COCs or COPs, is that without an adhesion promotion layer or substrate surface activation prior to applying the gas diffusion barriers and conductive coatings, the coatings on the substrate would be prone to have areas with delamination. The delamination of the coatings from the substrate provides channels for the penetration of oxygen or water vapor into the element chamber, in particular if there is delamination near the seal. Alternatively, delamination happening near the center of the EC device also would cause openings for oxygen or water vapor in the gas diffusion barrier and therefore defeating its purpose. Accordingly, the adhesion promotion layer may be a translucent layer of a metal coating such as aluminum, titanium, copper or chromium, preferably chromium, coated preferably using magnetron sputtering, with a thickness lower than 20 nm, preferably lower than 5 nm, and a transmission that is greater than 50%. A polymer based adhesion promotion layer or primer may be employed such as a polyimide coating. The substrate may be surface activated prior to coating using a plasma jet at atmospheric pressure, such as corona plasma. Using a mixture of gases such as nitrogen, argon and oxygen. Another option is the use of ion beam etching in a vacuum environment, also using gases such as oxygen and nitrogen, where the ion energy can be between 100 to 5000 keV and the ion dosage at the $1\times10^{14}$ to $1\times10^{18}$. Other options for surface activation are oxygen plasma etch and ultraviolet light in ozone atmosphere. Yet another option for the activation of the surface is the use of flame treatment, and the use of $SiO_2$ flame pyrolysis treatment.

Illustrative nanowires coatings or conductive metal mesh materials include, but are not limited to silver, gold, stainless steel, aluminum, copper, nickel, molybdenum, tungsten, iridium, rhodium, ruthenium, platinum, cobalt, palladium, chromium, titanium, and alloys thereof. Nanowire based films can be formed via solution coated chemistry, printing processes, photographic technologies, rolling lithography, or self-assembly. Examples of films via solution coated chemistry include ClearOhm™ from Cambrios Technologies Corporation (10-300$\Omega$/□, >80% T) and Flexx™ from Carestream Advanced Materials (10-100 $\Omega$/□, >80% T). These films are based on PET. A nanowire based film produced via self-assembly is Sante® from Cima NanoTech (10-100

Ω/sq, >80% T). Conductive metal mesh films are produced using a wide array of processing including printing, rolling lithography, and photographic technology. Exclucent™ film (<0.1 n/sq, 80% T) from Applied Nanotech is produced through a printing process. NanoWeb™ metal mesh (5 Ω/sq, >80% T) from Rolith Inc. is produced through rolling lithography. Fujifilm offers a Exclear™ metal mesh (1-50 Ω/sq, >80% T) that is produced using a silver halide photographic process.

The nanowire based films have the advantage of a random pattern which minimizes moire issues. The repeating pattern of the metal mesh conductors is prone to moire issues and requires the proper orientation of overlapping films to minimize the effect.

One major issue with a repeating pattern such in a metal wire mesh conductor is that when illuminated with a near point light source such as a headlamp, street light or the sun an intense diffraction pattern can be seen when viewed through the conductor in transmission and/or reflection. The pattern can be severe enough to make the conductor unusable in many commercial applications such as windows for buildings and aerospace and auto dimming rearview mirrors. The visibility of the diffraction pattern can be minimized by varying the spacing between the metal lines in the mesh, by varying the width of the metal lines in the mesh pattern, by continuously varying the angle of the mesh lines relative to one another so the relative distance between the lines varies or by making the size of the metal mesh features (mesh spacing and metal line width) large enough or small enough to not create diffraction patterns in the visible light range. Another way to reduce the visible intensity of these diffraction patterns is to render the metal surface black or non-reflective such that it will absorb light incident upon it. This can be done in a number of ways such as by printing a black ink under the metal mesh, on top of the metal mesh or both or by forming black dendritic layer of nickel or chrome or other metal on the surface of the metal mesh. The black light absorbing patterned coatings could be applied on top of or under a second continuous conductive coating if one is applied over or under the metal mesh layer. For electrochromic device applications it is preferred that the black coating that is applied on top of the metal mesh be conductive.

Figure 3:
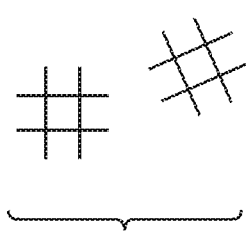
FIG. 3 is a schematic drawing of conductive wires and mesh patterns.
Figure 3:
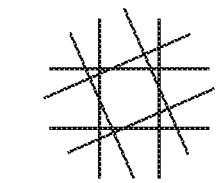
Figure 3:
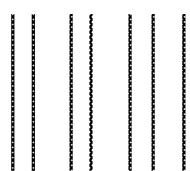

In other embodiments, the pattern of mesh on one substrate may be offset from the pattern on the second substrate. For example, the meshes may be offset by from 10 to 80 degrees. Or, the pattern may be varied such that the wires in one direction are not regularly spaced such that there is a randomized variation of conductive material across the surface of the substrate. FIG. 3 illustrates various patterns of deposition of the conductive meshes or coatings and the offsets.

Depending on the electrochromic device configuration, it may be preferred to have higher conductivity or lower resistance in one direction than the other. Typically the higher conductivity would be oriented perpendicular to a high conductivity electrical bus, which is usually to be located at a perimeter of an electrochromic device. This can be achieved by orienting more nanowires perpendicular to the bus than parallel to the bus, or by having a wire mesh patter with more mesh line perpendicular to the bus or wider line perpendicular to the bus, or thicker lines perpendicular to the bus. In this way, the device would color more quickly with no, or minimal, loss in transmission. The ratio of resistance perpendicular to the bus to the resistance parallel to the bus may be about 10% or greater, or 20% or greater, or 50% or greater. For flexible substrates that may be repeatably bent, a mesh pattern other than straight line that intersect at a 90 degree angle is preferred to impart flexiblitly and stretchability. Lines that intersect at angles less than 90 degrees and/or lines that incorporate a curved or squiggle pattern that impart stretchability into the mesh are preferred.

In another embodiment, the conductive layer may be a metal sheet that is applied to the substrate in a very thin layer. For example, a copper, silver, or gold sheet may be applied using an inkjet technology, where the sheet has a transmission of greater than 50% and a resistance of 0.1 Ω/sq, or less. This includes where the sheet has a transmission of greater than 60%, 70%, or 80%. This includes where the sheet has a transmission of 50% to 90%, or any range therebetween.

It should be noted that applying the metal pattern by inkjet technology is referred to as an additive process. Other additive printing processes include gravure printing and screen printing. Subtractive methods can be used to form the pattern using etching or laser ablation.

Although the metal mesh conductors have a very low sheet resistance, the density of the metallic traces is not high enough to prevent selective coloring around the traces. To further assist in the transfer of charge from the substrate and conductive material to the chamber and the electrochromic medium confined therein, and to protect the metal mesh from dissolution into the electrochromic medium during cycling, a conductive coating may be applied over the conductive nanowire coating or conductive metal mesh. The coating can be applied over the metal only to protect it or it can be over the metal and the substrate not covered by the metal. The coating between the metals may have a sheet resistance of less than 10,000 Ω/sq. This may include less than 1,000 Ω/sq, less than 100 Ω/sq, or less than 10 Ω/sq. Illustrative conductive coating materials include, but are not limited to, a thin metal coating such as gold, a transparent conductive metal oxide (e.g., indium tin oxide (ITO), indium zinc oxide (IZO), zinc oxide, and tin oxide), graphene, carbon nanotubes, or a conductive polymer such as poly(3, 4-ethylenedioxythiophene) polystyrene sulfonate (PEDOT-PSS), polythiophenes, polyanilines, polyacetylenes, polypyrroles, and polyphenylene vinylenes. For example, the material may be indium tin oxide, indium zinc oxide, graphene, or carbon nanotubes.

Another issue with TCO coatings is that typical TCO's such as ITO require a thermal treatment in order to reach the highest conductivity of the material. On plastics, the temperature of the thermal treatments are very limited due to the low glass transition temperature of the substrate, which are typically under 100° C. Thus, another disadvantage of TCO's on plastics is that the material has a sub-optimal conductivity due to the thermal restrictions, between 3 to 5 times lower than thermally treated ITO. In order to reach a low sheet resistance, the thickness of the TCO needs to be increased to compensate for the decreased electrical conductivity. A problem with brittle films such as TCOs is that as the film gets thicker, the coating becomes more sensitive to bending—in other words for the same amount of bending, a thick coating will fail earlier than a thinner coating, and therefore a thinner coating with same sheet resistance as a thicker coating is preferable. The electrical sheet resistance of a TCO such as ITO can be lowered without significantly heating the substrate by flash treating the TCO with a high intensity light pulse from a xenon lamp or a laser. This treatment allows for thinner TCO coatings at the same sheet resistance as thicker untreated coatings.

In another aspect, any of the above electrochromic devices is provided further including an ultraviolet light-absorbing film on the first substrate. Such a film may be included on the front surface or the rear surface of the first substrate. An ultraviolet light-absorbing material may also be incorporated directly into the plastic substrate material itself when formed. As will be illustrated below, the electrochromic medium may include an ultraviolet light-absorbing material to prevent, or at least minimize, degradation of the electrochromic medium and plastic substrate by ultraviolet light. For the purposes of this particular discussion with regard to the application of an ultraviolet light-absorbing film, the first substrate is the substrate to be facing an ultraviolet light source. For example, if the electrochromic device is a window, the first substrate is the substrate that will be exposed to the outside of the building, and subject to incident light from the sun. Accordingly, the first surface of the first substrate may include the ultraviolet light-absorbing film. Alternatively, or in addition to, the second surface of the first substrate may include an ultraviolet light-absorbing material. Each substrate itself may include a ultraviolet light-absorbing material. This will provide for two advantages.

The first advantage is related to preservation of the electrochromic medium. The electrochromic medium may be sensitive to degradation by ultraviolet light. Accordingly, the ultraviolet-absorbing film may protect the electrochromic medium from ultraviolet light exposure through the first substrate. The second advantage is to allow for the ability to UV-cure some of or all of the electrochromic medium by UV light exposure through the second substrate that has higher UV transmission. Electrochromic media may be gelled to prevent movement of the electrochromic medium within the device, leakage from the device in the event of breakage, or to provide a unitary structure by binding of the first substrate to the second substrate. However, in many cases the electrochromic medium includes dissolved ultraviolet light-absorbing species; therefore gels that are curable using ultraviolet light cannot be employed. Use of an ultraviolet light-absorbing film on the first substrate allows for the electrochromic medium to include lesser amounts of ultraviolet light-absorbing species or no ultraviolet light-absorbing species while allowing for curing an ultraviolet light-curable gel as the electrochromic medium, as it may be activated by illuminating with ultraviolet light through the second substrate for a time sufficient to produce a gel in the chamber. Materials that are used to seal the perimeter of the EC device can also be UV cured in this manner.

Any of the plastic substrates described herein may include a scratch-resistant coating on the surface to prevent or at least minimize to the extent possible damage to the outer surfaces of the devices. In some embodiment, the devices have a scratch resistant coating on the outer surfaces of the device, while a gas diffusion barrier is included on an inner surface(s) of the device such that the plastic substrate provides a first barrier to gas incursion into the device, while the gas diffusion barrier provides a second barrier to gases that reach through the plastic substrate.

Other coatings on any of the devices can include anti-fingerprint coatings, anti-fogging coatings, and anti-smudge coatings and anti-reflection coatings.

Electrochromic Media

The electrochromic medium may take a number of different forms such as thermoplastic polymeric films, solution phase, or gelled phase. Illustrative electrochromic media are those as described in U.S. Pat. Nos. 4,902,108; 5,888,431; 5,940,201; 6,057,956; 6,268,950, 6,635,194 and 8,928,966, and U.S. Patent Application Publication No. 2002/0015214.

The anodic and cathodic electrochromic materials can also include coupled materials as described in U.S. Pat. No. 6,249,369. And, the concentration of the electrochromic materials can be selected as taught in U.S. Pat. No. 6,137,620. Additionally, a single-layer, single-phase medium may include a medium where the anodic and cathodic materials are incorporated into a polymer matrix as is described in International Patent Application Serial Nos. PCT/EP98/03862 and PCT/US98/05570.

The electrochromic medium may be multilayer or multiphase. In multilayered, the medium may be made up in layers and includes an electroactive material attached directly to an electrically conducting electrode or confined in close proximity thereto which remains attached or confined when electrochemically oxidized or reduced. In multiphase, one or more materials in the medium undergoes a change in phase during the operation of the device, for example a material contained in solution in the ionically conducting electrolyte forms a separate layer on the electrically conducting electrode when electrochemically oxidized or reduced.

The electrochromic medium may include materials such as, but not limited to, anodics, cathodics, light absorbers, light stabilizers, thermal stabilizers, antioxidants, thickeners, viscosity modifiers, tint providing agents, redox buffers, and mixtures thereof. Suitable redox buffers include, among others, those disclosed in U.S. Pat. No. 6,188,505. Suitable UV-stabilizers may include: 2-ethyl-2 cyano-3,3-diphenyl acrylate, (2-ethylhexyl)-2-cyano-3,3-diphenyl acrylate, 2-(2'-hydroxy-4'-methylphenyl)benzotriazole, 3-[3-(2H-benzotriazole-2-yl)-5-(1,1-dimethylethyl)-4-hydroxyphenyl]propionic acid pentyl ester, 2,4-dihydroxybenophenone, 2-hydroxy-4-methoxybenzophenone, 2-ethyl-2'-ethoxyalanilide, and the like.

According to some embodiments, the anodic materials may include, but are not limited to, ferrocenes, ferrocenyl salts, phenazines, phenothiazines, and thianthrenes. Illustrative examples of anodic materials may include di-tert-butyl-diethylferrocene; 5,10dimethyl-5,10-dihydrophenazine (DMP); 3,7,10-trimethylphenothiazine, 2,3,7,8-tetramethoxy-thianthrene, 10-methylphenothiazine, tetramethylphenazine (TMP), and bis(butyltriethylammonium)-para-methoxytriphenodithiazine (TPDT). The anodic materials may also include those incorporated into a polymer film such as polyaniline, polythiophenes, polymeric metallocenes, or a solid transition metal oxide, including, but not limited to, oxides of vanadium, nickel, iridium, as well as numerous heterocyclic compounds. Other anodic materials may include those as described in in U.S. Pat. Nos. 4,902,108; 6,188,505; and 6,710,906.

In any of the above aspects, the anodic material may be a phenazine, a phenothiazine, a triphenodithiazine, a carbazole, an indolocarbazole, a biscarbazole, or a ferrocene confined within the second polymer matrix, the second polymer matrix configured to prevent or minimize substantial diffusion of the anodic material in the activated state. As with the viologen, the anodic material may be sequestered within the polymer matrix by being physically trapped within, or the anodic material may be functionalized such that it is amenable to being polymerized or reacted with the polymer to be covalently bonded to the polymer.

In some embodiments, the anodic material may be a compound represented by:

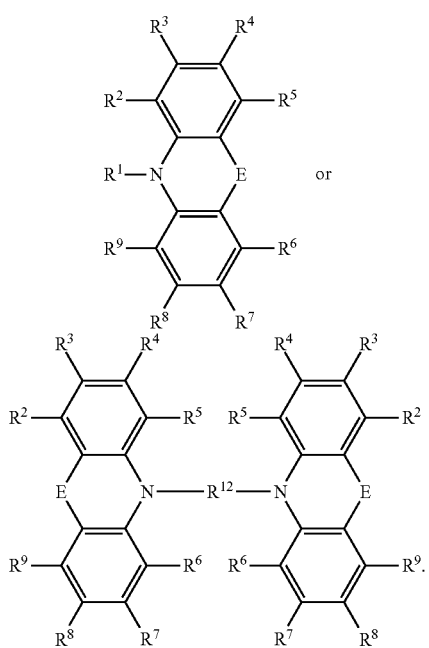

In the above formula, E is S or $NR^{10}$; $R^1$ and $R^{10}$ are individually an alkyl group interrupted by at least one ammonium group; $R^2$-$R^9$ are individually H, F, Cl, Br, I, CN, $OR^{11}$, $SR^{11}$, $NO_2$, alkyl, aryl, amino, or any two adjacent groups of $R^2$-$R^9$ may join to form a monocyclic, polycyclic, or heterocyclic group; each $R^{11}$ is individually H or alkyl; and $R^{12}$ is an alkylene group. In some embodiments, E is $NR^{10}$ and $R^2$-$R^9$ are H or $OR^{11}$. In other embodiments, E is S and $R^7$ and $R^8$ join to form a heterocyclic group.

The anodic material may be a compound represented by:

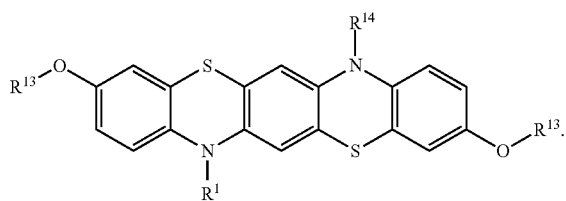

In the above formula, $R^{14}$ is an alkyl group interrupted by at least one ammonium group. In any of the compounds described above, $R^1$, $R^{14}$, and $R^{13}$ may be represented by:

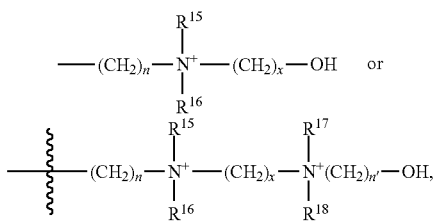

where $R^{15}$-$R^{18}$ are individually H or alkyl; n is 1, 2, 3, 4, 5, 6, 7, 8, 9, 10, 11, or 12; n' is 1, 2, 3, 4, 5, 6, 7, 8, 9, 10, 11, or 12; and x is 1, 2, 3, 4, 5, 6, 7, 8, 9, 10, 11, or 12. In some embodiments, n is 4, x is 2, and n' is 11.

Cathodic materials may include, for example, viologens, such as methyl viologen, octyl viologen, or benzyl viologen; ferrocinium salts, such as (6-(tri-tert butylferrocenium)hexyl)triethylammonium. It will be appreciated that all such species name only the cationic portion of the molecule and a wide variety of anions may be used as the counterion(s). While specific cathodic materials have been provided for illustrative purposes only, numerous other conventional cathodic materials are likewise contemplated for use including, but by no means limited to, those disclosed in previously referenced and incorporated U.S. Pat. Nos. 4,902,108, 6,188,505, and 6,710,906. Moreover, it is contemplated that the cathodic material may include a polymer film, such as various polythiophenes, polymeric viologens, an inorganic film, or a solid transition metal oxide, including, but not limited to, tungsten oxide.

Illustrative cathodic materials, for use in any of the devices described herein, include viologens and metal oxides. Illustrative metal oxides include those that are electrochromic such as tungsten oxide. Tungsten oxide may act as both a cathodic material as well as a conductive material.

In any of the above aspects, the cathodic material may be a viologen or a non-dimerizing or low-dimerizing viologen. Illustrative viologens include, but are not limited to, methyl viologen, octyl viologen, benzyl viologen, polymeric viologens, and the viologens described in U.S. Pat. Nos. 7,372,609; 4,902,108; 6,188,505; and 6,710,906. Other viologens may include those of Formula (I), (III), or (IV):

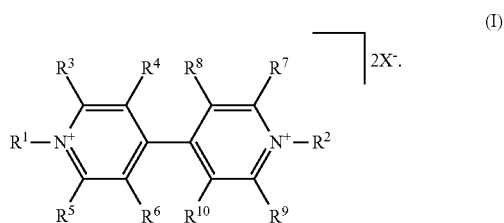

In Formula I, $R^1$ and $R^2$ are individually alkyl, siloxy alkyl, hydroxyalkyl, alkenyl, or aralkyl; $R^4$, $R^6$, $R^8$, and $R^{10}$ are individually H, OH, F, Cl, Br, I, CN, $NO_2$, alkyl, or aryl; $R^3$, $R^5$, $R^7$, and $R^9$ are individually H, OH, F, Cl, Br, I, CN, $NO_2$, alkyl, or aryl, and X is an anion. However, Formula (I) is subject to the proviso that $R^3$ and $R^5$, or $R^7$ and $R^9$, or $R^3$, $R^5$, $R^7$, and $R^9$ are individually secondary alkyl, tertiary alkyl, or aryl. Formula (III):

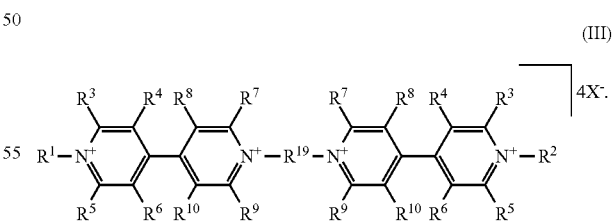

In Formula (III), $R^1$ and $R^2$ are individually alkyl, siloxyalkyl, hydroxyalkyl, alkenyl, or aralkyl; $R^4$, $R^6$, $R^8$, $R^{10}$ are individually H, OH, F, Cl, Br, I, CN, $NO_2$, alkyl, or aryl; $R^3$, $R^5$, $R^7$, and $R^9$ are individually H, OH, F, Cl, Br, I, CN, $NO_2$, alkyl, or aryl; $R^{19}$ is $(CH_2)_{n'}$ or arylene, and n' is from 1 to 12; X is an anion; and wherein $R^3$, and $R^5$, or $R^7$, and $R^9$ are individually secondary alkyl, tertiary alkyl, or aryl. Formula (IV)

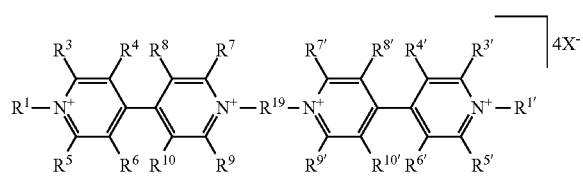

In Formula (IV), $R^1$ and $R^{1'}$ are individually alkyl, siloxyalkyl, hydroxyalkyl, alkenyl, or aralkyl; $R^4$, $R^6$, $R^8$, $R^{10}$, $R^{4'}$, $R^{6'}$, $R^{8'}$, and $R^{10'}$ are individual) H, OH, F, Cl, Br, I, CN, $NO_2$, alkyl, or aryl; $R^7$, $R^9$, $R^{7'}$, and $R^{9'}$ are individually H, OH, F, Cl, Br, I, CN, $NO_2$, alkyl, or aryl; $R^{19}$ is $(CH_2)_{n'}$ or arylene, and n' is from 1 to 12; X is an anion; and either $R^3$, $R^5$, $R^{3'}$, and $R^{5'}$ are individually secondary alkyl, tertiary alkyl, or aryl; $R^7$, $R^9$, $R^{7'}$, and $R^{9'}$ are individually secondary alkyl, tertiary alkyl, or aryl. In some embodiments, for the non-dimerizing electrochromic compound represented by Formula (IV), $R^{19}$ is $(CH_2)_{n'}$ or arylene, and n' is from 1 to 12. For any of the viologens described, the counterion (anion) may be any of a halide, a borate, a fluoroborate, a tetraaryl borate, a hexafluoro metal or metalloid, a sulfate, a sulfonate, a sulfonamide, a carboxylate, a perchlorate, a tetrachloroferrate, or the like, or mixtures of any two or more thereof. Illustrative counterions/anions include, but are not limited to: $F^-$, $Cl^-$, $Br^-$, $I^-$, $BF_4^-$, $PF_6^-$, $SbF_6^-$, $AsF_6^-$, $ClO_4^-$, $SO_3CF_3^-$, $N(CF_3SO_2)_2^-$, $C(CF_3SO_2)_3^-$, triflate (trifluoromethansulfonate), $N(SO_2C_2F_5)^-$, or $BAr_4^-$, wherein Ar is an aryl or fluorinated aryl or a bis(trifluoromethyl)aryl group. In some embodiments, X is a tetrafluoroborate or a bis(trifluoromethylsulfonyl) imide anion.

The cathodic material may be a protic soluble electrochromic material (e.g., soluble in a protic solvent such as an alcohol and/or water), or a single component electrochromic material (i.e., the electrochromic material includes a compound that includes both cathodic and anodic moieties in the same molecule or cation/anion combination), such as described in U.S. Provisional Appl. No. 62/257,950, filed on Nov. 20, 2015, and 62/258,051, filed on Nov. 20, 2015.

Further examples of anodic and cathodic materials may be found in U.S. Pat. Nos. 4,902,108; 5,294,376; 5,998,617; 6,193,912; and 8,228,590.

For illustrative purposes only, the concentration of the anodic and/or cathodic materials in the electrochromic medium can range from approximately 1 millimolar (mM) to approximately 500 mM and more preferably from approximately 2 mM to approximately 100 mM. While particular concentrations of the anodic as well as cathodic materials have been provided, it will be understood that the desired concentration may vary greatly depending upon the geometric configuration of the chamber containing the electrochromic medium.

For purposes of the present disclosure, a solvent of electrochromic medium may comprise any of a number of common, commercially available solvents including 3-methylsulfolane, dimethyl sulfoxide, dimethyl formamide, tetraglyme and other polyethers; alcohols such as ethoxyethanol; nitriles, such as acetonitrile, glutaronitrile, 3-hydroxypropionitrile, and 2-methylglutaronitrile; ketones including 2-acetylbutyrolactone, and cyclopentanone; cyclic esters including beta-propiolactone, gamma-butyrolactone, and gamma-valerolactone; organic carbonates including propylene carbonate (PC), ethylene carbonate and methyl ethyl carbonate; and mixtures of any two or more thereof.

The electrochromic medium may include a thermoplastic polymer in which the electrochromic materials are confined (an "electrochromic thermoplastic"). Such media are described in U.S. Provisional Application No. 62/184,704, filed on May 25, 2015. Such media may include a thermoplastic polymer, an electrochromic material, and a solvent or plasticizer, where the thermoplastic polymer is present in an amount sufficient to form a substantially formable gel matrix of the electrochromic materials (i.e. the matrix contains solvent, but it is self-supporting, moldable, and formable). Such media are prepared by dissolving the thermoplastic polymer under heating in the solvent, and also dissolving the electrochromic material in the solvent. Upon cooling the thermoplastic polymer sets up forming a formable gel material. The formable gel material may be molded or cut to size.

The formable gel material may contain as the electrochromic material a cathodic material, an anodic material, or both a cathodic and an anodic material. Where the electrochromic material is either only cathodic or only anodic, the device may be prepared in a sandwich style such that the first substrate may be associated with a thermoplastic polymer material including the cathodic material, and the second substrate is associated with the anodic thermoplastic material, with the two substrates joined with or without an electrolyte layer between the separate sides. In other words, the cathodic material is confined in one half of the device, while the anodic material is confined in the other half of the device, with or without a separate electrolyte layer or ion-exchange membrane or porous membrane therebetween. In some embodiment, the thermoplastic material may include only an anodic material and is associated with a first substrate, while the second substrate contains a cathodic coating, such as a metal oxide coating. Of course, the thermoplastic material may contain both an anodic material and a cathodic material.

As noted above, the formable gels may be formed by dissolving the thermoplastic material in the solvent, along with the electrochromic material, and any other additives that are desired, such as electrolytes, UV absorbing materials, electrochromic buffers, and other stabilizers. Once the solution of the thermoplastic material is prepared, it may be poured into a mold, a layer drawn with a draw knife to a desired thickness, or placed between release layers such that it may be rolled to a desired thickness. The molding or pouring may be onto a release liner such that after the material cools and sets up as a formable gel, the release liner may be released from the now electrochromic thermoplastic matrix. The resulting formable gel may be cut or trimmed to the desired shape.

The thermoplastic electrochromic films may be formed by dissolving a thermoplastic polymer and an electrochromic material, and optionally other additives, in a solvent to form a film-forming composition. The dissolution of the materials may be conducted at elevated temperature. For example, illustrative elevated temperatures may be from about 30° C. to about 150° C. The thermoplastic polymer is included in the solvent at a concentration such that upon cooling the thermoplastic polymer forms a self-supporting matrix, the matrix holding the solvent, the electrochromic material, and, if present, any optional additives. To form the film, upon dissolution, but prior to setting up of the self-supporting matrix, the film-forming composition may be cast on a conductive substrate, or the film-forming composition may be cast on a release liner. Upon cooling, a self-supporting film of the thermoplastic polymer, electrochromic material, and the optional additives is formed. Where a release liner is used, once the film-forming composition is applied to the release liner, a second, overlaying release liner may be applied, the film-forming composition sandwiched therebetween, and the entire assembly put through an extruding press or roller system, such that a thermoplastic electrochromic film of uniform thickness is formed. The release liner may then be removed and the film applied to a conductive surface of a first substrate, whereupon the second release liner may be removed and a conductive surface of a second substrate applied. Upon edge sealing the electrochromic is thus formed.

Where the electrochromic device has been constructed using a thermoplastic film, further post-treatment could be envision where additional crosslinking of the thermoplastic is carried out to increase the long term mechanical stability of the thermoplastic film, thus producing a cross-linked electrochromic film. This may be carried out through additional UV curing of the thermoplastic film.

Where the electrochromic device includes more than one thermoplastic film and/or cross-linked electrochromic film, for example a first thermoplastic film containing a cathodic material, and a second thermoplastic film containing an anodic material, the first and second thermoplastic films may be separated by an ion-exchange or porous membrane, or a third thermoplastic film to separate the first and second films. The third thermoplastic film may contain an electrolyte or salts to assist in conduction between the first and second films. Similarly, a first cross-linked film containing a cathodic material, and a second cross-linked film containing an anodic material, the first and second cross-linked films may be separated by an ion-exchange or porous membrane, or a third film that is either thermoplastic or cross-linked to separate the first and second films. The third film may contain an electrolyte or salts to assist in conduction between the first and second films. As further example, a first thermoplastic film containing a cathodic material, and a second cross-linked film containing an anodic material, the first and second films may be separated by an ion-exchange or porous membrane, or a third film that is either thermoplastic or cross-linked to separate the first and second films. The third film may contain an electrolyte or salts to assist in conduction between the first and second films. Yet another example includes a first cross-linked film containing a cathodic material, and a second thermoplastic film containing an anodic material, the first and second films may be separated by an ion-exchange or porous membrane, or a third film that is either thermoplastic or cross-linked to separate the first and second films. The third film may contain an electrolyte or salts to assist in conduction between the first and second films.

The electrochromic material included in the polymer-based electrochromic films may be a cathodic material, an anodic material, or both a cathodic and an anodic material. Thus, the possible combinations are numerous for different situations. The polymer-based electrochromic film may contain various materials for various applications. As a non-limiting illustration, the polymer-based electrochromic film may contain all of the components necessary for an electrochromic device such that the film merely need be disposed between conductive substrates such that a potential may be applied to the device to effect the color change.

Illustrative thermoplastic polymers include, but are not limited to, acrylates, methacrylates, polyesters, polycarbonates, polylactides, polyvinyl esters, polyurethanes, cellulose esters, poly vinyl formal, poly vinyl butyral, polyethylene-co-vinyl acetate, and co-polymers of any two or more thereof. Cross-linked films may further be produced by cross-linking such thermoplastic polymers.

Sealing Member

The sealing member is used to join the first substrate to the second substrate. The sealing member may be an adhesive material applied to one substrate or the other, or a dual system adhesive where a first component is applied to one substrate and a second component is applied to the other and the two components combine on contact to bond the substrates together. Illustrative adhesives include, but are not limited to, those containing epoxies, urethanes, cyanoacrylates, acrylics, polyimides, polyamides, polysulfides, phenoxy resin, polyolefins and silicones. The sealing member may include a thermal cure system such as a thermal cure epoxy or an ultraviolet light curable seal.

The sealing member may alternatively be a weld between the first substrate and the second substrate. In other words, a melting and joining of two plastic substrates to one another or using a third material such as when using a hot-melt. Of course, care must be taken in application of the conductive materials on the surface of the substrates such that shorting of the device does not occur. In some embodiments, the weld between the first and the second substrate is an ultrasonic weld. It should be noted that a combination of techniques could be used to seal the device. For instance a portion of the seal could be formed by welding uncoated areas of the substrates together followed by applying a sealing adhesive that is UV cure to areas of the substrate that are coated with a coating such as a metal mesh coating or a nanowire coating.

The sealing member may be a heat seal film which attaches to first and second substrate at the edge of the first and second substrate around the circumference of the device. Thus, the heat seal film covers an edge of the front surface of the first substrate and extends to an edge of the rear surface of the second substrate. This sealing member provides a barrier for the electrochromic medium or film from moisture and oxygen. The heat seal films are typically multilayers consisting of an inner sealant layer, middle core layer, and outer barrier layer which may or may not include an aluminum foil layer. The film can be applied using a heat sealer to attach the film to the edge of the device. An example of a heat seal film without a foil layer includes Torayfan® CBS2 from Toray, and an example of a metallized heat seal film is Torayfan® PWXS from Toray. Additionally, a pressure sensitive adhesive can be added to the inner sealant layer to adhere the film at room temperature or to improve adhesion during heat sealing. An example of a pressure sensitive adhesive for this purpose is 8142KCL from 3M™.

In another aspect, any of the above electrochromic devices is provided further including an electrochromic film, in addition to, or instead of, the electrochromic medium. The electrochromic films may be polymer-based films (as described herein) that incorporate one or more electrochromic species in addition to a thermoplastic polymer. The electrochromic film may include, in addition to the thermoplastic polymer, an anodic material, a cathodic material, or both a cathodic material and an anodic material. The films may also include other additives such as plasticizers, cross-linking agents, electrochromic buffers, ultraviolet light-absorbing species, electrolyte salts, stabilizers, and gel-forming materials.

Within the chamber, the first surface of the second substrate, the second surface of the first substrate, or both such surfaces may be coated with the polymer-based films incorporating one or more electrochromic species. As an illustration, the first surface of the second substrate may be coated with a polymer-basd electrochromic film that includes an anodic material and a thermoplastic polymer, as described above. In such illustrations, the chamber may then include a medium that incorporates a cathodic material, or a cathodic material may be coated on the second surface of the first substrate as either a polymer-based electrochromic film or as a metal oxide, such as tungsten oxide.

Electrochromic devices that include a thermoplastic electrochromic film may be formed of flexible substrates. For example, the flexible substrates may be a flexible plastic substrate having a flexible coating. This will provide for the formation of flexible electrochromic device. In one embodiment, a first and a second flexible plastic substrate is coated with gas barrier layer and a conductive material. A device is prepared, such that a second surface of the first substrate is proximal to a first surface of a second substrate, with a sealing member joining the first substrate to the second substrate, and forming a chamber therebetween. However, prior to joining the substrates, the second surface of the first substrate is coated with an electrochromic material, such as a metal oxide like tungsten oxide, or a thermoplastic electrochromic film, while the first surface of the second substrate is coated with a metal oxide or thermoplastic electrochromic film. Alternatively, a thermoplastic electrochromic film incorporating a cathodic material, an anodic material, a thermoplastic polymer, and a solvent may be formed and applied to substrate having a conductive surface. The electrochromic device may then be formed by applying a second substrate with a conductive surface and edge sealing the device to retain and protect the thermoplastic electrochromic film within a chamber of the device. Edge sealing may include a polymeric adhesive such as an epoxy-containing material, or it may be a plastic weld, a heat seal film, a hot melt, a thermosetting material or a UV curing material.

The devices thus described, methods or preparing such devices are described. For example, devices having a polymer-based electrochromic film may be formed by assembling a first substrate, a second substrate, and the polymer-based electrochromic film disposed therebetween. This can include mere assembly of the various parts, or complete assembly from film fabrication to device manufacture.

In another aspect a process is provided forming a substrate for an electrochromic device having a polymer film. The process may include coating a first surface of a first substrate with a first polymer-based electrochromic film, the polymer-based electrochromic film having at least one first electroactive material and a first thermoplastic polymer. Illustrative coating techniques may include, but are not limited to, slot-die coating, gravure coating, curtain coating, spray coating, dip coating, extrusion coating, or slide coating. Such processes should be amenable to a wide range of electrochromic materials include the use of a viologen, a phenazine, a phenothiazine, a triphenodithiazine, a carbazole, an indolocarbazole, a biscarbazole, or a ferrocene. This may be repeated multiple times for multi-layer devices, or for separate substrates, each containing a different type of polymer-based electrochromic films, where it is a cathodic, anodic, or both cathodic and anodic species in the same film.

In another aspect, an electrochromic device includes a first substrate having a first surface and a second surface; a second substrate having a first surface and a second surface; and a sealing member, joining the second surface of the first substrate to the first surface of the second substrate forming a chamber therebetween; wherein first substrate contains an ultraviolet light absorbing material; the second surface is coated with a first polymer-based electrochromic film (as described herein) comprising an anodic material; and the chamber comprises an fluid medium containing a UV-curable gelling agent. UV-curable gelling agents may include a polyfunctional vinyl compound or an oligomer such as an acrylate, methacrylate, or vinyl ether, and a radical photoinitiator. Illustrative vinyl compounds include but are not limited to, 1,4-butanediol diacrylate, tris[2-(acryloyloxy)ethyl] isocyanurate, poly(propylene glycol) diacrylate, poly(propylene glycol) dimethacrylate, poly(ethylene glycol) diacrylate, trimethylolpropane propoxylate triacrylate and 1,4-butanediol divinyl ether, and combinations thereof, to name a few. In addition to the polyfunctional vinyl compounds, monomeric vinyl compounds may also be included into the UV-curable gel to help modify the final properties of the gel, like methyl methacrylate or butyl acrylate, to name a few. The radical photoinitiator, which also would need to be incorporated, could be, but not limited to, 2-Hydroxy-2-methylpropiophenone, 2,2-dimethoxy-2-phenylacetophenone (Irgacure® 651), 2,2-diethoxyacetophenone, and phenyl bis(2,4,6-trimethylbenzoyl)phosphine oxide (Irgacure® 819).

In some embodiments, the fluid medium contains a cathodic material, as described above. For example, the cathodic material may be a viologen.

In other embodiments, the fluid medium further may include an ultraviolet light-absorbing material, an ultraviolet-curable gelling agent, or a mixture of any two or more thereof.

In some embodiments, the first surface of the second substrate is coated with a second polymer-based electrochromic film including a cathodic material. In such embodiments, the cathodic material may be any of those as described above. In some embodiments, the cathodic material is a viologen.

The anodic material in such devices may be any of those as described above, including, but not limited to, a phenazine, a phenothiazine, a triphenodithiazine, a carbazole, an indolocarbazole, a biscarbazole, or a ferrocene.

In some embodiments, the first surface of the second substrate is coated with a metal oxide. For example, the metal oxide may be tungsten oxide.

The fluid medium in the device may include a solvent. In some embodiments, the fluid medium may also include an electrolytic salt.

In another aspect, a process of gelling a fluid medium in an electrochromic device is provided where an electrochromic device is provided, the device including a first substrate having a first surface comprising a ultraviolet absorbing layer, and a second surface; a second substrate having a first surface and a second surface; and a sealing member, joining the second surface of the first substrate to the first surface of the second substrate forming a chamber therebetween. The chamber may include a fluid medium including an ultraviolet light-curable gelling agent, with the process further including irradiating the ultraviolet light-curable gelling agent through the second substrate with ultraviolet light.

In such embodiments, the fluid medium may further include any of the above cathodic materials, ultraviolet light-absorbing materials, or a mixture thereof. In the process, the second surface of the first substrate may include a first polymer-based electrochromic layer including an anodic material. Illustrative anodic materials are those as described above, including but not limited to, a phenazine, a phenothiazine, a triphenodithiazine, a carbazole, an indolocarbazole, a biscarbazole, or a ferrocene. In the process, the first surface of the second substrate is coated with a second polymer-based electrochromic film including a cathodic material, as described above, or a metal oxide that is cathodic.

In the process, also included may be a step of applying the sealing member to either the first substrate or the second substrate and applying the remaining substrate to the sealing member. The process may also include curing the sealing member.

In the process, the sealing member may include a thermal cure resin, an ultraviolet light curable resin, or a combination thereof. Such resins may include, but are not limited to epoxy resins, cyanoacrylates, silicones, urethanes, polyimides, acrylate resins, and or methacrylate resins and combinations of any two or more thereof. Where the resin is UV curable, it may be cured by then irradiating the sealing member with ultraviolet light through the second substrate, and where the resin is thermally curable, it may be cured by heating or exposing the resin to heat. Alternatively, the sealing member includes a weld between the first substrate and the second substrate, hot melting a third thermal plastic, or heat seal film.

In another aspect, an electrochromic device is provided. The device has a first substrate having a front surface and a rear surface including a conductive nanowire or a conductive metal mesh. In the device, the front surface, the rear surface, or both the front surface and the rear surface of the first substrate includes a gas diffusion barrier. The device also has a second substrate including a front surface having a conductive nanowire or a conductive metal mesh. In the device, the front surface, the rear surface, or both the front surface and the rear surface of the second substrate includes a gas diffusion barrier. In the device, the first substrate is joined to the second substrate by a sealing member, where the rear surface of the first substrate and the front surface of the second substrate with the sealing member define a chamber therebetween and the first substrate is a plastic substrate.

In some embodiments, the second substrate is a plastic substrate and the front surface, the rear surface, or both the front surface and the rear surface of the second substrate comprises a gas diffusion barrier. The chamber of the device may include an electrochromic medium having a cathodic material, an anodic material, or both a cathodic and an anodic material. In such embodiments, the electrochromic device is flexible or rigid having two plastic substrates that bend and flex.

The rear surface of the first substrate may include a conductive nanowire coating, a conductive metal mesh, or an IMI stack, and the front surface of the second substrate may include a conductive nanowire coating, a conductive metal mesh, or an IMI stack as well. The metal mesh materials and IMI stacks are as described above. In addition to the metal meshes, nanowire coatings, and IMI stacks, the rear surface of the first substrate and the front surface of the second substrate may include a conductive coating disposed between the conductive nanowire coating, conductive metal mesh, or IMI stack and the chamber. Alternatively, in addition to the metal meshes and IMI stacks, the rear surface of the first substrate and the front surface of the second substrate may include a conductive coating disposed between the nanowire coating/conductive metal mesh/IMI stack and the chamber or between the nanowire coating/conductive metal mesh/IMI stack and the substrate.

Illustrative conductive coatings may include a thin metal layer, a transparent conductive metal oxide, carbon nanotubes, graphene, or a conductive polymer. For example, the conductive coating may include a thin gold layer, a thin platinum group metal layer, indium tin oxide, indium zinc oxide, carbon nanotubes, graphene, or poly(3,4-ethylenedioxythiophene) polystyrene sulfonate (PEDOT-PSS). In some embodiments, the conductive coating may include indium tin oxide.

In some embodiments, the first substrate may include a plastic substrate, the second substrate may be a plastic substrate, or both the first substrate and the second substrate are plastic. One or both of the first and second substrates may also be flexible or rigid.

As in other devices described herein, the sealing member of the device may include a UV-curable resin, a thermally curable resin, hot melt, a weld, or a heat seal film. Illustrative such sealing members are described above.

As in any of the devices above, either or both of the first surface of the first substrate and the second surface of the second substrate may include a scratch-resistant coating. The scratch resistant coatings may be organic, inorganic, or combinations of both. Hard coatings may be composed of organic resins only, hybrid coatings through bonding of organic resins with inorganic particles, or composite coatings of organic resins with inorganic fillers. The hard coats commonly used for plastic substrates are solvent based, UV curable acrylics with silica fillers. Illustrative scratch-resistant coatings include, but are not limited to, Acier C50PG available from Nidek Company which is a hybrid organic/inorganic, UV curable, acrylic based hard coat. Inorganic coatings applied by physical vapor deposition or chemical vapor deposition can be used to form a hard coat. These layers are typically in the range of 100 nm to 25 μm thick. A hard coat may use a combination of a hard organic layer as a base coat followed by a much harder inorganic layer. A hard coat may also be where a diamond like carbon (DLC) layer is applied over the inorganic hard coat layer. The organic layer is typically 25 to 1000 microns thick, the inorganic layer is typically 100 nm to 25 microns thick and the diamond like carbon layer is typically 1 to 100 nm thick.

The gas diffusion barrier(s) on the device may include, but is not limited to, a layer applied by plasma-enhanced chemical vapor deposition (PECVD), a layer applied by neutral beam assisted sputtering (NBAS), a layer applied by atomic layer deposition (ALD), a poly(ethylene-co-vinyl alcohol) (EVOH) coating, a polyvinyl alcohol (PVOH) coating, a polymeric film of self-assembled nanoparticles (SNAP), multilayer barrier of alternating thin films of cationic and anionic polymers deposited by layer-by-layer deposition or a multilayer barrier comprising alternating layers of organic and inorganic materials, or a flexible, thin glass film.

Where the cathodic or anodic materials are sequestered within a polymer matrix, the polymer matrix may be solid polymer or gel polymer that is thermoplastic or crosslinked. For example, as illustrated by the examples, the polymer may be an acrylate-based polymer that is dissolved in a solvent which incorporates the anodic or cathodic material. This solution is then coated on the conductive surface of a substrate, where the solvent is then removed. The resultant film is an acrylate film that may be hard or tacky to the touch. Or, the polymer film may be a gel that contains solvent as well as the anodic or cathode material. In addition, the polymer film may be subsequently cross-linked for increased mechanical stability. Other possible polymer matrix systems that could be used to sequester an anodic and cathodic materials: polyacrylate, polymethacrylates, polyethers, polyesters, polycarbonates and polyurethanes, polysiloxanes, polysilanes, polyacrylonitriles, polystyrenes, polymethacrylonitriles, polyamides, polyimides, polyvinylidenehalides, polyvinyl butyral, and co-polymers or combinations of any two or more thereof. Further examples of polymer matrix materials used in electrochromic devices can be found in U.S. Pat. Nos. 6,635,194 and 5,940,201.

As noted above, the anodic or cathodic materials may also be part of the polymeric matrix with the anodic or cathodic material being covalently bound to the polymer. This may be accomplished with the presence of a functional group on the anodic or cathodic material that is reacted with the polymer or monomers that make up the polymer. For example, where the anodic or cathodic materials contain a hydroxyl group, the anodic or cathodic material may be bound into a polymer matrix via a condensation reaction or react with an isocyanate functionality to form a polyurethane-based polymer matrix. Amines may also react with isocyanate functionalities to form urea and biuret linkages. It can be also anticipated that other cross-linked polymeric matrix can be formed using a multifunctional epoxy or polymers in combination with a curing agent like an amine, alcohol or anhydride or through base or acid catalyzed homopolymerization.

Illustrative materials that may be used as the first and second polymer matrix materials include, but are polymethacrylates, polyacrylates, polystyrenes, polyurethanes, polyethers, polyesters, polycarbonates, polysiloxanes, polysilanes, polyacrylonitriles, polymethacrylonitriles, polyamides, polyimides, polyvinylidenehalides, polyvinyl butyral and co-polymer and combinations of thereof. Further examples of polymer matrix materials can be found in U.S. Pat. Nos. 6,635,194 and 5,940,201.

The electrolyte may include a solvent and a salt. The salt may be a metal salt or an ammonium salt. Illustrative solvents for use in the electrolyte may include, but are not limited to, 3-methylsulfolane, dimethyl sulfoxide, dimethyl formamide, tetraglyme and other polyethers; alcohols such as ethoxyethanol; nitriles, such as acetonitrile, glutaronitrile, 3-hydroxypropionitrile, and 2-methylglutaronitrile; ketones including 2-acetylbutyrolactone, and cyclopentanone; cyclic esters including beta-propiolactone, gamma-butyrolactone, and gamma-valerolactone; carbonates including propylene carbonate (PC), ethylene carbonate, methy ethyl carbonate; and homogenous mixtures of the same. While specific solvents have been disclosed as being associated with the electrolyte, numerous other solvents that would be known to those having ordinary skill in the art having the present disclosure before them are likewise contemplated for use. Illustrative salts include, but are not limited to, metal or ammonium salts, such as but not limited to $Li^+$, $Na^+$, $K^+$, $NR'_4$, where each R' is individually H, alkyl, or cycloalkyl, of the following anions $F^-$, $Cl^-$, $Br^-$, $I^-$, $BF_4^-$, $PF_6^-$, $SbF_6^-$, $AsF_6^-$, $ClO_4^-$, $SO_3CF_3^-$, $N(CF_3SO_2)_2^-$, $C(CF_3SO_2)_3^-$, $N(SO_2C_2F_5)^-$, $Al(OC(CF_3)_3)_4^-$, or $BAr_4^-$, wherein Ar is a aryl or fluorinated aryl group such as, but not limited to, $C_6H_5$, $3,5-(CF_3)_2C_6H_3$, or $C_6F_5$.

The present invention, thus generally described, will be understood more readily by reference to the following examples, which are provided by way of illustration and are not intended to be limiting of the present invention.

EXAMPLES

Example 1

Electrochromic Gel Medium. An electrochromic medium was prepared from combining 38 mM of N,N'-bis(n-octyl) viologen tetrafluoroborate; 27 mM of 5,10-dihydro-5,10-dimethylphenazine; 15 mM of Tinuvin® 384-2 from BASF; 50 mM of ethyl-2-cyano-3,3-diphenylacrylate; 0.5 mM of decamethyl ferrocene; 0.5 mM of decamethyl ferrocinium tetrafluoroborate; 2.2% by weight of a random copolymer made with 2-hydroxyethylmethacrylate and methylarylate at a 1:10 molar ratio; 0.15% by weight of an isocyanate crosslinker (Luprnate® MI from BASF), and about 0.3 to 2.0 parts per million dibutyltin diacetate urethane catalyst in a propylene carbonate solvent.

Example 2

Electrochromic Device using Rigid Plastic Substrates with Thermally Cured Seal. Rigid plastic substrates (approximately 50 mm wide, 125 mm long, 1.8 mm thick) were formed by injection molding of Zeonor 1420R. The second surface of the top plate and the first surface of the bottom plate were coated with indium zinc oxide (IZO) at conditions appropriate for the polymer substrate. An epoxy bead containing spacer beads was dispensed around the perimeter of the bottom plate on top of the IZO coating. A small gap was left in the bead to act as a fill port after the seal is cured. The top plate was positioned with an offset to the bottom plate allowing access and electrical contact to the conductive coatings from the edges. The top plate was pressed down on the epoxy to the spacer beads forming a cell. The epoxy seal was thermally cured at a temperature appropriate for the seal and polymer substrate. The cell was filled with the electrochromic gel medium of Example 1 and the fill port was plugged using a UV curable epoxy. Busbars were applied to the offset edges producing a rigid plastic electrochromic device with a thermally cured seal.

Example 3

Electrochromic Device using Rigid Plastic Substrates with UV Cured Seal. Same substrate preparation as Example 2. An epoxy bead containing spacer beads was dispensed around the perimeter of the bottom plate on top of the IZO coating. A small gap was left in the bead to act as a fill port after the seal is cured. The top plate was positioned with an offset to the bottom plate allowing access and electrical contact to the conductive coatings from the edges. The top plate was pressed down on the epoxy to the spacer beads forming a cell. The epoxy seal was UV cured at a time and intensity appropriate for the seal and polymer substrate. The cell was filled with the electrochromic gel medium of Example 1 and the fill port was plugged using a UV curable epoxy. Busbars were applied to the offset edges producing a rigid plastic electrochromic device with a UV cured seal.

Example 4

Electrochromic Device using Rigid Plastic Substrates with Gas Barrier Coatings and a Thermally Cured Seal. Rigid plastic substrates (approximately 50 mm wide, 125 mm long, 1.8 mm thick) were formed by injection molding of Zeonor 1420R. The second surface of the top plate and the first surface of the bottom plate were coated with gas barrier layer followed by indium zinc oxide (IZO) at conditions appropriate for the polymer substrate. An epoxy bead containing spacer beads was dispensed around the perimeter of the bottom plate on top of the IZO coating. A small gap was left in the bead to act as a fill port after the seal is cured. The top plate was positioned with an offset to the bottom plate allowing access and electrical contact to the conductive coatings from the edges. The top plate was pressed down on the epoxy to the spacer beads forming a cell. The epoxy seal was thermally cured at a temperature appropriate for the seal and polymer substrate. The cell was filled with the electrochromic gel medium of Example 1 and the fill port was plugged using a UV curable epoxy. Busbars were applied to the offset edges producing a rigid plastic electrochromic device with gas barrier coatings and a thermally cured seal. Illustrative gas barrier coatings may be applied as follows: $SiO_2$—sputtered single or double layer, accucoat $SiO_2$—low temperature PVD process, Excapsulix ALD—Atomic layer deposition of $Al_2O_3$, Gencoa—$AlO_x$/poly HMDSO multilayers, or PlasmaSi—PECVD $SiN_x$

Example 5

Electrochromic Device using Rigid Plastic Substrates with Gas Barrier Films and a Thermally Cured Seal. Rigid plastic substrates (approximately 50 mm wide, 125 mm long, 1.8 mm thick) were formed by injection molding of Zeonor 1420R. A gas barrier film was applied to the second surface of the top plate and the first surface of the bottom plate using UV curable liquid optically clear adhesives or barrier optically clear adhesives with the barrier layers orientated towards the plastic substrate and the PET carrier film orientated to the outside. The exposed PET films were coated with indium zinc oxide (IZO) at conditions appropriate for the polymer substrate. An epoxy bead containing spacer beads was dispensed around the perimeter of the bottom plate on top of the IZO coating. A small gap was left in the bead to act as a fill port after the seal is cured. The top plate was positioned with an offset to the bottom plate allowing access and electrical contact to the conductive coatings from the edges. The top plate was pressed down on the epoxy to the spacer beads forming a cell. The epoxy seal was thermally cured at a temperature appropriate for the seal and polymer substrate. The cell was filled with the electrochromic gel medium of Example 1 and the fill port was plugged using a UV curable epoxy. Busbars were applied to the offset edges producing a rigid plastic electrochromic device with gas barrier films and a thermally cured seal. Illustrative gas barrier films include Kuraray EVAL—EvOH film (ethylene vinyl alcohol), Kuraray Exceval—PvOH film (propylene vinyl alcohol), Fujifilm—Transparent Super Gas Barrier film, and 3M—FTB3-125 Barrier film.

Example 6

Electrochromic Device using Flexible Plastic Substrates with Gas Barrier Films, Metal Mesh Conductors and a UV Cured Seal. Flexible gas barrier films (approximately 75 mm wide, 82 mm long, 125 microns thick) were cut from stock. Flexible metal mesh conductor films (approximately 75 mm wide, 82 mm long, 125 microns thick) overcoated with cold ITO were cut from stock. The metal mesh films were applied to the second surface of the top gas barrier film and the first surface of the bottom gas barrier film using UV curable liquid optically clear adhesives or barrier optically clear adhesives with the barrier layers orientated towards the plastic substrate and the PET carrier film orientated to the outside. A conductive silver ink trace was applied to the offset edge of the assembled films and thermally cured. The silver ink trace will act as a busbar when the device is assembled. An epoxy bead containing spacer beads was dispensed around the perimeter of the bottom substrate on top of the ITO overcoated metal mesh. A small gap was left in the bead to act as a fill port after the seal is cured. The top substrate was positioned with an offset to the bottom substrate allowing access and electrical contact to the silver ink on the edges. The top substrate was pressed down on the epoxy to the spacer beads forming a cell. The epoxy seal was UV cured at a time and intensity appropriate for the seal and polymer substrate. The cell was filled with the electrochromic gel medium of Example 1 and the fill port was plugged using a UV curable epoxy. Electrical connections were applied to the offset edges producing a flexible plastic electrochromic device with gas barrier films, metal mesh conductors and a UV thermally cured seal. The metal mesh film used was Applied Nanotech, Inc, Exclucent™ copper metallic and the gas barrier film was 3M FTB3-125 Barrier film.

Example 7

Electrochromic Device using Glass Clad Rigid Plastic Substrates with Thermally Cured Seal. Rigid plastic substrates (approximately 100 mm wide, 100 mm long, 2.0 mm thick) were cut from polycarbonate sheet. The polycarbonate substrates were clad on one side with 0.3 mm soda lime glass which was coated with indium zinc oxide (IZO). The glass cladding was adhered to the plastic substrate using UV curable liquid optically clear adhesives or was laminated using thermoplastic or thermoset optical interlayers with the IZO coating facing outward. An epoxy containing spacer beads was dispensed around the perimeter of the bottom substrate on top of the IZO coating. A small gap was left in the bead to act as a fill port after the seal is cured. The top substrate was positioned with an offset to the bottom substrate allowing access and electrical contact to the conductive coatings from the edges. The top substrate, with the IZO coating orientated towards the bottom substrate IZO coating, was pressed down on the epoxy to the spacer beads forming a cell. The epoxy seal was thermally cured at a temperature appropriate for the seal and polymer substrate. The cell was filled with electrochromic fluid and the fill port was plugged using a UV curable epoxy. Busbars were applied to the offset edges producing a glas clad, rigid plastic electrochromic device with a thermally cured seal.

Example 8

Figure 4:
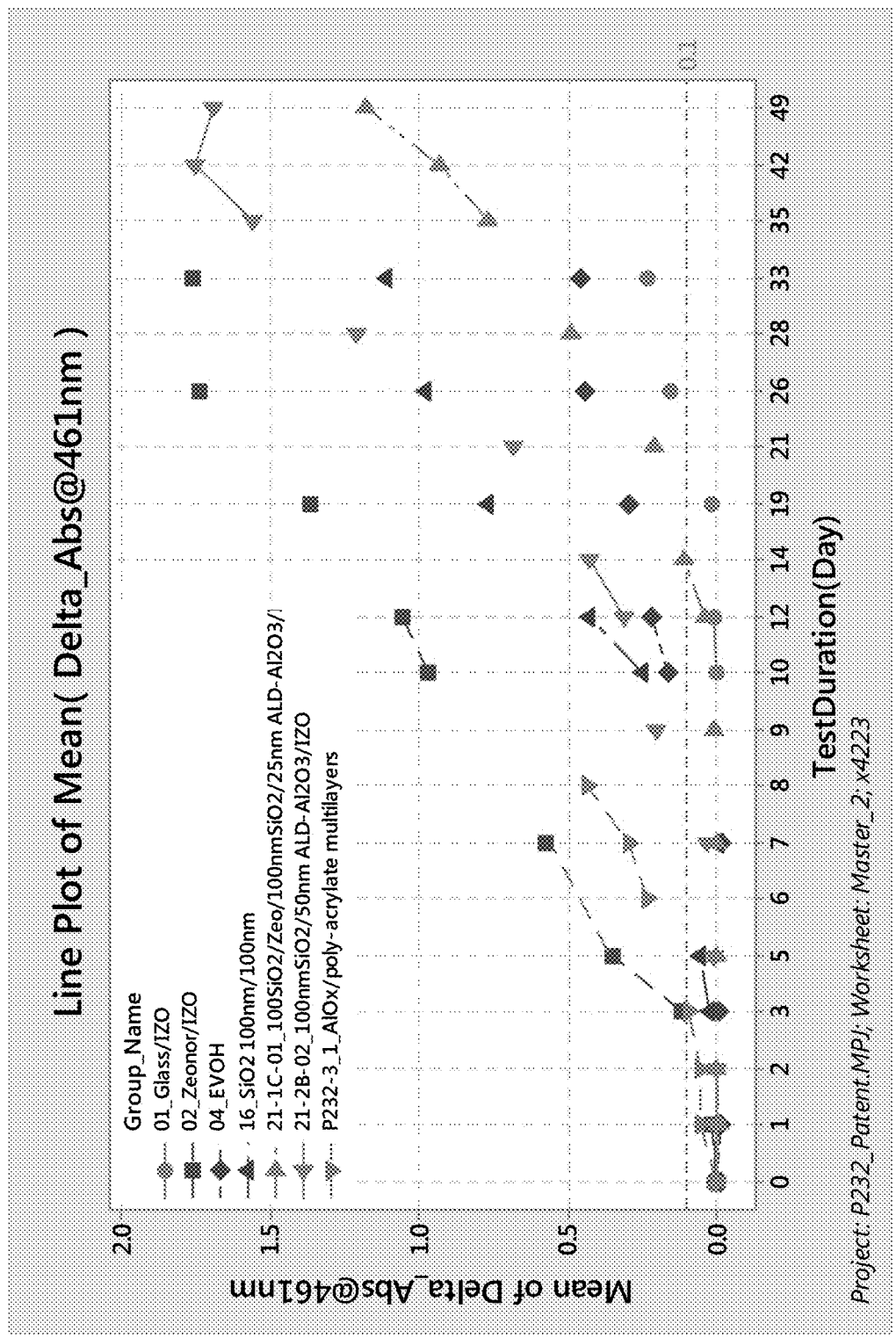
FIG. 4 illustrates the absorbance increase for electrochromic devices due to oxygen incursion into the device, according to the working examples.

Representative plastic devices of the present technology were put into a Oxygen Autoclave chamber (400 psi) and their optical properties were measured regularly with a UV/Vis spectrometer. The absorbance at 461 nm was attributed to oxygen contamination of the electrochromic medium and was monitored and compared to reference parts (01_Glass/IZO, and 02_Zeonor/IZO). The plastic device without a gas barrier coating represents the highest absorbance change over time. FIG. 4 shows the results of oxygen testing performance for various gas barrier materials. A plastic device with no barrier [02_Zeonor/IZO(-18)] shows an absorbance change greater than 0.1 units after 3 days exposure. A plastic device with $SiO_2$ and $Al_2O_3$ deposited by ALD [21-2B-02_100nmSiO$_2$/50 nm ALD-Al$_2$O$_3$/IZO] shows better stability and did not pass the 0.1 absorbance unit increase threshold until the 8 day point. For devices comprising EVOH [04_EVOH(-35)] and $SiO_2$ [16_SiO$_2$ 100 nm/100 nm(-102)] gas barriers, the 0.1 unit absorbance change threshold occurred after 9 days. Furthermore, a 100 nm $SiO_2$ layer coated on both side of the plastic substrates [21-1C-01_100SiO$_2$/Zeo/100nmSiO$_2$/25 nm ALD-Al$_2$O$_3$/IZO] performed almost 5 times better than a plastic device without a barrier. Based on FIG. 4, a device with a $AlO_x$/poly-acrylate multilayer barrier [P232-3_1_AlO$_x$/poly-acrylate multilayers(-R302)] obtained similar performance to the no barrier [02_Zeonor/IZO(-18)] plastic device in the Oxygen autoclave test reaching 0.1 units of absorbance change after 3 days of testing. However, the speed of degradation beyond 3 days is slower than the no barrier device. Thus, all plastic devices with gas barriers showed significantly slower rates of degradation than devices with no gas barrier.

Example 9

An electrochromic device with flexible plastic substrates was constructed. An indium tin oxide (ITO) coated piece of 8"×10" PET (6 mil thickness; 120 Ω/sq sheet resistance) was coated with a mixture made by dissolving 1.02 grams of bis (11-hydroxyundecyl) viologen bis[bistrifluoromethanesulfonyl imide] (NTf) and 0.38 grams of HDT (hexamethylene diisocyanate trimer purchased from Sigma-Aldrich) in 7.0 grams of a solvent mixture ("SM1"), plus 117 microliters of a 0.6 wt % solution of dibutyltin diacetate (DBTDA) catalyst in SM1, thereby forming a first film. This coating was made using a #10 Mayer rod to control thickness. A second piece of 8"×10" PET was coated with a solution made by dissolving 1.02 grams of bis [5, 10-(4-(3-hydroxypropyl dimethylammonium) butyl]-5, 10-dihydrophenazine NTf and 0.38 grams of HDT in 7.0 grams of SM1 and 117 microliters of DBTDA in SM1 thereby forming a second film. This film was also made with a #10 Mayer rod. The films were allowed to cure under a nitrogen atmosphere overnight in an oven at 60° C. A third coating was prepared by combining 15 grams Vinylec H (SPI Supplies), 15 grams Vinylec E (SPI Supplies), 1.6 grams tetramethylammonium tetrafluoroborate, and 88 grams propylene carbonate and heating (120° C.) under nitrogen with mechanical stirring forming a relatively high viscosity solution that was then applied between two release liners (3M 4935). The release liners and fluid were fed through the nip on a manual extruder to deliver a 250 micron coating. The coating was then allowed to cool to ambient temperature and maintained under nitrogen until use. 3.5"×3.5" squares of the first and second coatings were cut and the EC coating removed along one edge using methanol and a cotton swab and electrical contact made to the ITO via 3M adhesive strip 3011. A section of the third coating slightly larger than 3.5"×3.5" was cut and applied to the first coating so that the entire surface of the first coating was covered by the third coating. The second coating which was then applied to the exposed surface of the third coating such that the electrical contacts to the first and second coatings were on opposite sides of the element. The element was then placed between two pieces of glass (2.2 mm, 5"×5" each) and placed under reduced pressure for 30 minutes to remove bubbles at the coating interfaces, after which the element was returned to ambient pressure via a slow nitrogen bleed. An epoxy seal was placed around the perimeter and electrical contacts, and subsequently cured at ambient temperature overnight to complete the element.

Illustrative Embodiments

Following is a description of non-limiting illustrative embodiments.

Para. A. An electrochromic device comprising: a first flexible or rigid plastic substrate comprising: a front surface; and a rear surface; wherein: the rear surface comprises a first conductive material; and the front surface, the rear surface, or both the front surface and the rear surface of the first substrate comprises a gas diffusion barrier; a second flexible or rigid plastic substrate comprising: a front surface; and a rear surface; wherein: the front surface comprises a second conductive material; wherein: the first substrate is joined to the second substrate by a sealing member, where the rear surface of the first substrate and the front surface of the second substrate with the sealing member define a chamber therebetween.

Para. B. The electrochromic device of Para. A, wherein the front surface, the rear surface, or both the front surface and the rear surface of the second substrate comprises a gas diffusion barrier; and optionally wherein the front surface, the rear surface, or both the front surface and the rear surface of the first and second substrates comprises an adhesion promotion layer.

Para. C. The electrochromic device of Para. A or B, wherein the chamber comprises an electrochromic medium comprising a cathodic material and an anodic material.

Para. D. The electrochromic device of any one of Paras. A-C, wherein the gas diffusion barrier(s) comprises a layer applied by plasma-enhanced chemical vapor deposition (PECVD), a layer applied by neutral beam assisted sputtering (NBAS), a layer applied by atomic layer deposition (ALD), a co-polymer of ethylene vinyl alcohol, a polyvinyl alcohol, a polymeric film of self-assembled nanoparticles (SNAP), a multilayer barrier comprising alternating layers of organic and inorganic materials, a multilayer barrier comprising alternating thin films of cationic and anionic polymers, or a flexible, thin glass film adhered or laminated to the substrate.

Para. E. The electrochromic device of any one of Paras. A-D, wherein the first substrate, the second substrate, or both the first substrate and the second substrate comprise polyethylene naphthalate (PEN), polyacrylonitrile, polyethylene terephthalate (PET), polycarbonate, a cycloolefin polymer (COP), a cycloolefin co-polymer (COC), an acrylic, a polyamide, or an epoxy.

Para. F. The electrochromic device of any one of Paras. A-E, wherein the first conductive material comprises a conductive nanowire coating, a conductive metal mesh, or an IMI stack.

Para. G. The electrochromic device of any one of Paras. A-F, wherein second conductive material comprises a conductive nanowire coating, a conductive metal mesh, an insulator/metal/insulator stack (IMI stack), a transparent polymer filled with nanoparticles (such as indium tin oxide particles), carbon nanotubes, graphene, or a conductive polymer.

Para. H. The electrochromic device of any one of Paras. A-G, wherein the first conductive material comprises a first conductive nanowire coating, a first conductive metal mesh, or a first IMI stack; and the second conductive material comprises a second conductive nanowire coating, a second conductive metal mesh, or a second IMI stack, a second transparent polymer filled with nanoparticles (such as indium tin oxide particles), carbon nanotubes, graphene, or a second conductive polymer.

Para. I. The electrochromic device of any one of Paras. A-H, wherein the conductive nanowire coating, the conductive metal mesh, IMI stack, transparent polymer filled with nanoparticles, carbon nanotubes, graphene, or conductive polymer exhibits a resistance of less than 50 Ω/sq.

Para. J. The electrochromic device of any one of Paras. A-I, wherein the conductive nanowire coating, the conductive metal mesh, IMI stack, transparent polymer filled with nanoparticles, carbon nanotubes, graphene, or conductive polymer exhibits a resistance of less than 10 Ω/sq, or less than 5 Ω/sq.

Para. K. The electrochromic device of any one of Paras. A-J further comprising a conductive coating overlaying either or both of the first or second conductive material.

Para. L. The electrochromic device of Para. K, wherein the conductive coating comprises a transparent conductive oxide, carbon nanotubes, graphene, or a conductive polymer.

Para. M. The electrochromic device of Para. K or L, wherein the conductive coating comprises indium tin oxide, indium zinc oxide, carbon nanotubes, graphene, or poly(3,4-ethylenedioxythiophene) polystyrene sulfonate (PEDOT-PSS).

Para. N. The electrochromic device of Para. M, wherein the conductive coating comprises indium tin oxide or indium zinc oxide.

Para. O. The electrochromic device of any one of Paras. A-N, wherein the sealing member comprises a thermally-curable seal or an ultraviolet-curable seal.

Para. P. The electrochromic device of any one of Paras. A-O, wherein the sealing member comprises an epoxy.

Para. Q. The electrochromic device of any one of Paras. A-P, wherein the sealing member comprises a weld between the first substrate and the second substrate.

Para. R. The electrochromic device of any one of Paras. A-Q, wherein the sealing member comprises a hot melt or an ultrasonic weld between the first substrate and the second substrate, or a heat seal film that covers an edge of the front surface of the first substrate and extends to an edge of the rear surface of the second substrate.

Para. S. The electrochromic device of any one of Paras. A-R, wherein the chamber comprises a first polymer-based electrochromic film, preferably a first thermoplastic electrochromic film.

Para. T. The electrochromic device of Para. S, wherein the first polymer-based electrochromic film comprises a first electroactive material and a first thermoplastic polymer.

Para. U. The electrochromic device of Para. S or T, wherein the first electroactive material is a cathodic material, and anodic material, or a mixture of a cathodic material and an anodic material.

Para. V. The electrochromic device of Para. U, wherein the cathodic material comprises a viologen.

Para. W. The electrochromic device of Para. U or V, wherein the anodic material comprises a phenazine, a phenothiazine, a triphenodithiazine, a carbazole, an indolocarbazole, a biscarbazole, or a ferrocene.

Para. X. The electrochromic device of any one of Paras. S-W, wherein the first polymer-based electrochromic film comprises a plasticizer.

Para. Y. The electrochromic device of any one of Paras. S-X, wherein the first polymer-based electrochromic film is a cross-linked film.

Para. Z. The electrochromic device of any one of Paras. S-Y, wherein the chamber comprises a second polymer-based electrochromic film comprising a second electroactive material and a second thermoplastic polymer, preferably where the second polymer-based electrochromic film is a thermoplastic electrochromic film.

Para. AA. The electrochromic device of Para. Z, wherein the first and second polymer-based electrochromic films are separated by an ion-exchange or porous membrane, preferably where the first and second polymer-based electrochromic films are each independently thermoplastic electrochromic films.

Para. AB. A process of forming a substrate for an electrochromic device, the process comprising coating a first surface of a first flexible or rigid plastic substrate with a first polymer-based film, the polymer-based electrochromic film comprising at least one first electroactive material and a first thermoplastic polymer, the first surface further comprising a conductive nanowire coating, a conductive metal mesh, or an IMI stack, and a gas barrier coating on a second surface of the first flexible or rigid plastic substrate, the second surface being substantially parallel to and opposite from the first surface.

Para. AC. The process of Para. AB, wherein the coating comprises slot die coating, gravure coating, curtain coating, spray coating, dip coating, extrusion coating, or slide coating.

Para. AD. The process of Para. AB or AC further comprising joining the first surface of the first substrate comprising the first polymer-based electrochromic film (preferably a thermoplastic electrochromic film) to a first surface of a second substrate with a sealing member, and forming a chamber therebetween.

Para. AE. The process of Para. AD further comprising coating the first surface of the second substrate with a second polymer-based electrochromic film (preferably a thermoplastic electrochromic film), the second electrochromic film comprising at least one second electroactive material and a second thermoplastic polymer.

Para. AF. The process of any one of Paras. AB-AE, wherein the first electroactive material is a cathodic material.

Para. AG. The process of any one of Paras. AB-AF, wherein the first electroactive material is an anodic material.

Para. AH. The process of any one of Paras. AE-AG, wherein the second electroactive material is a cathodic material.

Para. AI. The process of Para. AH, wherein the second electroactive material is an anodic material.

Para. AJ. The process of any one of Paras. AE-AI, wherein the first electroactive material is a cathodic material and the second electroactive material is an anodic material.

Para. AK. The process of any one of Paras. AE-AI, wherein the first electroactive material is an anodic material and the second electroactive material is a cathodic material.

Para. AL. The process of any one of Paras. AD-AK further comprising filling the chamber with a fluid medium.

Para. AM. An electrochromic device comprising: a first flexible or rigid plastic substrate having a first surface and a second surface; a second flexible or rigid plastic substrate having a first surface and a second surface; and a sealing member, joining the second surface of the first substrate to the first surface of the second substrate forming a chamber therebetween; wherein: the first surface of the first substrate is coated with an ultraviolet light absorbing layer; the second surface is coated with a first polymer-based electrochromic film comprising an anodic material; and the chamber comprises an fluid medium containing a UV-curable gelling agent. The first polymer-based electrochromic film is preferably a thermoplastic electrochromic film.

Para. AN. The electrochromic device of Para. AM, wherein the fluid medium further comprises a cathodic material.

Para. AO. The electrochromic device of Para. AM or AN, wherein the cathodic material is a viologen.

Para. AP. The electrochromic device of any one of Paras. AM-AO, wherein the fluid medium further comprises an ultraviolet absorbing material.

Para. AQ. The electrochromic device of any one of Paras. AM-AP, wherein the first surface of the second substrate is coated with a second polymer-based electrochromic film comprising a cathodic material, preferably where the second polymer-basd electrochromic film is a thermoplastic electrochromic film.

Para. AR. The electrochromic device of Para. AQ, wherein the cathodic material is a viologen.

Para. AS. The electrochromic device of any one of Paras. AM-AR, wherein the anodic material is a phenazine, a phenothiazine, a triphenodithiazine, a carbazole, an indolocarbazole, a biscarbazole, or a ferrocene.

Para. AT. The electrochromic device of any one of Paras. AM-AS, wherein the first surface of the second substrate is coated with a metal oxide.

Para. AU. The electrochromic device of Para. AT, wherein the metal oxide is tungsten oxide.

Para. AV. The electrochromic device of any one of Paras. AM-AU, wherein the sealing member comprises a UV-curable resin or a thermal cure resin.

Para. AW. The electrochromic device of any one of Paras. AM-AV, wherein the sealing member comprises a weld between the first substrate and the second substrate.

Para. AX. An electrochromic device comprising: a first flexible or rigid plastic substrate comprising: a front surface; and a rear surface comprising a conductive nanowire coating, a conductive metal mesh, or an IMI stack; wherein: the front surface, the rear surface, or both the front surface and the rear surface of the first substrate comprises a gas diffusion barrier; a second flexible or rigid plastic substrate comprising: a front surface comprising a conductive nanowire coating, a conductive metal mesh, or an IMI stack; and a rear surface; wherein: the first substrate is joined to the second substrate by a sealing member, wherein the rear surface of the first substrate and the front surface of the second substrate with the sealing member define a chamber therebetween.

Para. AY. The electrochromic device of Para. AX, wherein the second substrate is a plastic substrate and the front surface, the rear surface, or both the front surface and the rear surface of the second substrate comprises a gas diffusion barrier.

Para. AZ. The electrochromic device of Para. AX or AY, wherein the chamber comprises an electrochromic medium comprising a cathodic material and an anodic material.

Para. BA. The electrochromic device of any one of Paras. AX-AZ, wherein the rear surface of the first substrate comprises the conductive metal mesh; and the front surface of the second substrate comprises the conductive metal mesh.

Para. BB. The electrochromic device of any one of Paras. AX-BA, wherein the conductive nanowire coating, the conductive metal mesh, or the IMI stack exhibits a resistance of less than 50 $\Omega$/sq.

Para. BC. The electrochromic device of any one of Paras. AX-BB, wherein rear surface of the first substrate and the front surface of the second substrate each comprise a conductive coating disposed between the conductive nanowire coating, the conductive metal mesh, or the IMI stack, and the chamber.

Para. BD. The electrochromic device of Para. BC, wherein the conductive coating comprises a transparent conductive oxide, carbon nanotubes, graphene, or a conductive polymer.

Para. BE. The electrochromic device of any one of Paras. AX-BD, wherein the first surface of the first substrate and the second surface of the second substrate comprise a scratch-resistant coating.

Para. BF. The electrochromic device of Para. BE, wherein the scratch-resistant coating comprises Acier C50PG.

Para. BG. The electrochromic device of any one of Paras. AX-BF, wherein the gas diffusion barrier(s) comprises a layer applied by plasma-enhanced chemical vapor deposition (PECVD), a layer applied by neutral beam assisted sputtering (NBAS), a layer applied by atomic layer deposition (ALD), a co-polymer of ethylene vinyl alcohol, a polyvinyl alcohol, a polymeric film of self-assembled nanoparticles (SNAP), or a multilayer barrier comprising alternating layers of organic and inorganic materials, or a multilayer barrier comprising of alternating thin film of cationic and anionic polymers, or a flexible, thin glass film.

Para. BG. An electrochromic device comprising: a flexible substrate comprising: a front surface; and a rear surface; wherein: the rear surface comprises a first conductive material; and the front surface, the rear surface, or both the front surface and the rear surface of the first substrate comprises a gas diffusion barrier; a rigid substrate comprising: a front surface; and a rear surface; wherein: the front surface comprises a second conductive material; wherein: the flexible substrate is shape conforming to the rigid substrate; and the flexible substrate is joined to the rigid substrate by a sealing member, where the rear surface of the flexible substrate and the front surface of the rigid substrate with the sealing member define a chamber therebetween.

Para. BH. The electrochromic device of Para. BG, wherein the front surface, the rear surface, or both the front surface and the rear surface of the rigid or flexible substrate comprises a gas diffusion barrier.

Para. BI. The electrochromic device of Para. BG or BH, wherein the chamber comprises an electrochromic medium comprising a cathodic material and an anodic material.

Para. BJ. The electrochromic device of any one of Paras. BG-BI, wherein the gas diffusion barrier(s) comprises a layer applied by plasma-enhanced chemical vapor deposition (PECVD), a layer applied by neutral beam assisted sputtering (NBAS), a layer applied by atomic layer deposition (ALD), a co-polymer of ethylene vinyl alcohol, a polyvinyl alcohol, a polymeric film of self-assembled nanoparticles (SNAP), a multilayer barrier comprising alternating layers of organic and inorganic materials, or a multilayer barrier comprising alternating thin films of cationic and anionic polymers.

Para. BK. The electrochromic device of any one of Paras. BG-BJ, wherein the flexible substrate, rigid substrate, or both the flexible substrate and the rigid substrate comprise polyethylene naphthalate (PEN), polyacrylonitrile, polyethylene terephthalate (PET), polycarbonate, a cycloolefin polymer (COP), a cycloolefin co-polymer (COC), an acrylic, a polyamide, or an epoxy.

Para. BL. The electrochromic device of any one of Paras. BG-BK, wherein the first conductive material comprises a conductive nanowire coating, a conductive metal mesh, or an IMI stack.

Para. BM. The electrochromic device of any one of Paras. BG-BL, wherein second conductive material comprises a conductive nanowire coating, a conductive metal mesh, or an IMI stack.

Para. BN. The electrochromic device of any one of Paras. BG-BM, wherein the first conductive material comprises a first conductive metal mesh; and the second conductive material comprises a second conductive metal mesh.

Para. BO. The electrochromic device of any one of Paras. BG-BN, wherein the conductive nanowire coating, the conductive metal mesh, or the IMI stack exhibits a resistance of less than 50 $\Omega$/sq, or less than 10 $\Omega$/sq, or less than 5 $\Omega$/sq.

Para. BP. The electrochromic device of any one of Paras. BG-BO further comprising a conductive coating overlaying either or both of the first or second conductive material.

Para. BQ. The electrochromic device of Para. BP, wherein the conductive coating comprises a transparent conductive oxide, carbon nanotubes, graphene, or a conductive polymer.

Para. BR. The electrochromic device of Para. BQ, wherein the conductive coating comprises indium tin oxide, indium zinc oxide, carbon nanotubes, graphene, or poly(3,4-ethylenedioxythiophene) polystyrene sulfonate (PEDOT-PSS).

Para. BS. The electrochromic device of Para. BR, wherein the conductive coating comprises indium tin oxide or indium zinc oxide.

Para. BT. The electrochromic device of any one of Paras. BG-BS, wherein the sealing member comprises a thermally-curable seal or an ultraviolet-curable seal.

Para. BU. The electrochromic device of any one of Paras. BG-BT, wherein the sealing member comprises an epoxy.

Para. BV. The electrochromic device of any one of Paras. BG-BU, wherein the sealing member comprises a weld between the first substrate and the second substrate.

Para. BW. The electrochromic device of any one of Paras. BG-BV, wherein the sealing member comprises a hot melt or an ultrasonic weld between the first substrate and the second substrate, or a heat seal film that covers an edge of the front surface of the first substrate and extends to an edge of the rear surface of the second substrate.

Para. BX. The electrochromic device of any one of Paras. BG-BW, wherein the chamber comprises a first polymer-based electrochromic film, preferably a first thermoplastic electrochromic film.

Para. BY. The electrochromic device of Para. BX, wherein the first polymer-based electrochromic film comprises a first electroactive material and a first thermoplastic polymer.

Para. BZ. The electrochromic device of Para. BY, wherein the first electroactive material is a cathodic material, and anodic material, or a mixture of a cathodic material and an anodic material.

Para. CA. The electrochromic device of Para. BZ, wherein the cathodic material comprises a viologen.

Para. CB. The electrochromic device of Para. BZ or CA, wherein the anodic material comprises a phenazine, a phenothiazine, a triphenodithiazine, a carbazole, an indolocarbazole, a biscarbazole, or a ferrocene.

Para. CC. The electrochromic device of any one of Paras. BX-CB, wherein the first polymer-based electrochromic film comprises a plasticizer.

Para. CD. The electrochromic device of any one of Paras. BX-CC, wherein the first polymer-based electrochromic film is a cross-linked film.

Para. CE. The electrochromic device of any one of Paras. BX-CD, wherein the chamber comprises a second polymer-based electrochromic film comprising a second electroactive material and a second thermoplastic polymer, preferably where the second polymer-based electrochromic film is a thermoplastic electrochromic film.

Para. CF. The electrochromic device of Para. CE, wherein the first and second polymer-based electrochromic films are separated by an ion-exchange or porous membrane, preferably where the first and second polymer-based electrochromic films are independently thermoplastic electrochromic films.

Para. CG. An electrochromic device comprising: a rigid substrate comprising: a front surface; and a rear surface; wherein: the rear surface comprises a first conductive material; and the front surface, the rear surface, or both the front surface and the rear surface of the first substrate comprises a gas diffusion barrier; a flexible substrate comprising: a front surface; and a rear surface; wherein: the front surface comprises a second conductive material; wherein: the flexible substrate is shape conforming to the rigid substrate; and the flexible substrate is joined to the rigid substrate by a sealing member, where the rear surface of the flexible substrate and the front surface of the rigid substrate with the sealing member define a chamber therebetween.

Para. CH. The electrochromic device of Para. CG, wherein the front surface, the rear surface, or both the front surface and the rear surface of the rigid or flexible substrate comprises a gas diffusion barrier.

Para. CI. The electrochromic device of Para. CG or CH, wherein the chamber comprises an electrochromic medium comprising a cathodic material and an anodic material.

Para. CJ. The electrochromic device of any one of Paras. CG-CI, wherein the gas diffusion barrier(s) comprises a layer applied by plasma-enhanced chemical vapor deposition (PECVD), a layer applied by neutral beam assisted sputtering (NBAS), a layer applied by atomic layer deposition (ALD), a co-polymer of ethylene vinyl alcohol, a polyvinyl alcohol, a polymeric film of self-assembled nanoparticles (SNAP), a multilayer barrier comprising alternating layers of organic and inorganic materials, or a multilayer barrier comprising alternating thin films of cationic and anionic polymers.

Para. CK. The electrochromic device of any one of Paras. CG-CJ, wherein the flexible substrate, rigid substrate, or both the flexible substrate and the rigid substrate comprise polyethylene naphthalate (PEN), polyacrylonitrile, polyethylene terephthalate (PET), polycarbonate, a cycloolefin polymer (COP), a cycloolefin co-polymer (COC), an acrylic, a polyamide, or an epoxy.

Para. CL. The electrochromic device of any one of Paras. CG-CL, wherein the first conductive material comprises a conductive nanowire coating, a conductive metal mesh, or an IMI stack.

Para. CM. The electrochromic device of any one of Paras. CG-CL, wherein second conductive material comprises a conductive nanowire coating, a conductive metal mesh, or an IMI stack.

Para. CN. The electrochromic device of any one of Paras. CG-CM, wherein the first conductive material comprises a first conductive nanowire coating, a first conductive metal mesh, or a first IMI stack; and the second conductive material comprises a second conductive nanowire coating, the second conductive metal mesh, or the second IMI stack.

Para. CO. The electrochromic device of any one of Paras. CG-CN, wherein the conductive nanowire coating, the conductive metal mesh, or the IMI stack exhibits a resistance of than 50 Ω/sq, or less than 10 Ω/sq, or less than 5 Ω/sq.

Para. CP. The electrochromic device of any one of Paras. CG-CO further comprising a conductive coating overlaying either or both of the first or second conductive material.

Para. CQ. The electrochromic device of Para. CP, wherein the conductive coating comprises a transparent conductive oxide, carbon nanotubes, graphene, or a conductive polymer.

Para. CR. The electrochromic device of Para. CQ, wherein the conductive coating comprises indium tin oxide, indium zinc oxide, carbon nanotubes, graphene, or poly(3,4-ethylenedioxythiophene) polystyrene sulfonate (PEDOT-PSS).

Para. CS. The electrochromic device of Para. CR, wherein the conductive coating comprises indium tin oxide or indium zinc oxide.

Para. CT. The electrochromic device of any one of Paras. CG-CS, wherein the sealing member comprises a thermally-curable seal or an ultraviolet-curable seal.

Para. CU. The electrochromic device of any one of Paras. CG-CT, wherein the sealing member comprises an epoxy.

Para. CV. The electrochromic device of any one of Paras. CG-CS, wherein the sealing member comprises a weld between the first substrate and the second substrate.

Para. CW. The electrochromic device of any one of Paras. CG-CS, wherein the sealing member comprises a hot melt or an ultrasonic weld between the first substrate and the second substrate, or a heat seal film that covers an edge of the front surface of the first substrate and extends to an edge of the rear surface of the second substrate.

Para. CX. The electrochromic device of any one of Paras. CG-CW, wherein the chamber comprises a first polymer-based electrochromic film, preferably a thermoplastic electrochromic film.

Para. CY. The electrochromic device of Para. CX, wherein the first polymer-based electrochromic film comprises a first electroactive material and a first thermoplastic polymer.

Para. CZ. The electrochromic device of Para. CX or CY, wherein the first electroactive material is a cathodic material, and anodic material, or a mixture of a cathodic material and an anodic material.

Para. DA. The electrochromic device of Para. CZ, wherein the cathodic material comprises a viologen.

Para. DB. The electrochromic device of Para. CZ or DA, wherein the anodic material comprises a phenazine, a phenothiazine, a triphenodithiazine, a carbazole, an indolocarbazole, a biscarbazole, or a ferrocene.

Para. DC. The electrochromic device of Para. 108, wherein the first polymer-based electrochromic film comprises a plasticizer.

Para. DD. The electrochromic device of any one of Paras. CX-DC, wherein the first polymer-based electrochromic film is a cross-linked film.

Para. DE. The electrochromic device of any one of Paras. CX-DD, wherein the chamber comprises a second polymer-based electrochromic film comprising a second electroactive material and a second thermoplastic polymer, preferably where the second polymer-based electrochromic film is a thermoplastic electrochromic film.

Para. DF. The electrochromic device of Para. DE, wherein the first and second polymer-based electrochromic films are separated by an ion-exchange or porous membrane, preferably where the first and second polymer-based electrochromic films are each independently thermoplastic electrochromic films.

Para. DG. The electrochromic device of any one of Paras. A-AA and AM-DF, wherein the front surface, the rear surface, or both the front surface and the rear surface of the first and second substrates comprises an adhesion promotion layer.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. An electrochromic device comprising:
   a first flexible or rigid plastic substrate comprising:
      a front surface; and
      a rear surface;
      wherein:
         the rear surface comprises a first conductive material; and
         the front surface, the rear surface, or both the front surface and the rear surface of the first substrate comprises a gas diffusion barrier;
   a second flexible or rigid plastic substrate comprising:
      a front surface; and
      a rear surface;

wherein:
the front surface comprises a second conductive material;
wherein:
the first substrate is joined to the second substrate by a sealing member, where the rear surface of the first substrate and the front surface of the second substrate with the sealing member define a chamber therebetween;
the chamber comprising an electrochromic medium comprising a cathodic material and an anodic material; and
the first conductive material comprises a conductive nanowire coating, a conductive metal mesh, or an insulator/metal/insulator stack (IMI stack).

2. The electrochromic device of claim 1, wherein the front surface, the rear surface, or both the front surface and the rear surface of the second substrate comprises a gas diffusion barrier.

3. The electrochromic device of claim 2, wherein the gas diffusion barrier(s) comprises a layer applied by plasma-enhanced chemical vapor deposition (PECVD), a layer applied by neutral beam assisted sputtering (NBAS), a layer applied by atomic layer deposition (ALD), a co-polymer of ethylene vinyl alcohol, a polyvinyl alcohol, a polymeric film of self-assembled nanoparticles (SNAP), a multilayer barrier comprising alternating layers of organic and inorganic materials, or a multilayer barrier comprising alternating thin films of cationic and anionic polymers, or a flexible, thin glass film.

4. The electrochromic device of claim 1, wherein the front surface, the rear surface, or both the front surface and the rear surface of the first and second substrates comprises an adhesion promotion layer.

5. The electrochromic device of claims 1, wherein the first substrate, the second substrate, or both the first substrate and the second substrate comprise polyethylene naphthalate (PEN), polyacrylonitrile, polyethylene terephthalate (PET), polycarbonate, a cycloolefin polymer (COP), a cycloolefin co-polymer (COC), an acrylic, a polyamide, or an epoxy.

6. The electrochromic device of claim 1, wherein the first conductive material comprises a first conductive nanowire coating, a first conductive metal mesh, or a first IMI stack; and the second conductive material comprises a second conductive nanowire coating, a second conductive metal mesh, or a second IMI stack.

7. The electrochromic device of claim 6, further comprising a conductive coating overlaying either or both of the first or second conductive material.

8. The electrochromic device of claim 7, wherein the conductive coating comprises a transparent conductive oxide, carbon nanotubes, graphene, or a conductive polymer.

9. The electrochromic device of claim 1, wherein the chamber comprises a first polymer-based electrochromic film.

10. The electrochromic device of claim 9, wherein the first polymer-based electrochromic film is a first thermoplastic electrochromic film.

11. The electrochromic device of claim 10, wherein the first thermoplastic electrochromic film comprises a first electroactive material and a first thermoplastic polymer.

12. The electrochromic device of claim 11, wherein the first electroactive material is a cathodic material, and anodic material, or a mixture of a cathodic material and an anodic material.

13. The electrochromic device of claim 12, wherein the cathodic material comprises a viologen.

14. The electrochromic device of claim 12, wherein the anodic material comprises a phenazine, a phenothiazine, a triphenodithiazine, a carbazole, an indolocarbazole, a bis-carbazole, or a ferrocene.

15. The electrochromic device of claim 10, wherein the chamber comprises a second thermoplastic electrochromic film comprising a second electroactive material and a second thermoplastic polymer.

16. The electrochromic device of claim 15, wherein the first and second thermoplastic electrochromic films are separated by an ion-exchange or porous membrane.

17. The electrochromic device of claim 1, wherein the sealing member comprises a hot melt or an ultrasonic weld between the first substrate and the second substrate, or a heat seal film that covers an edge of the front surface of the first substrate and extends to an edge of the rear surface of the second substrate.

18. A process of forming a substrate for an electrochromic device, the process comprising coating a first surface of a first flexible or rigid plastic substrate with a first polymer-based film, the polymer-based electrochromic film comprising at least one first electroactive material and a first thermoplastic polymer, the first surface further comprising a conductive nanowire coating, a conductive metal mesh, or an insulator/metal/insulator stack ("IMI stack"), and a gas barrier coating on a second surface of the first flexible or rigid plastic substrate, the second surface being substantially parallel to and opposite from the first surface.

* * * * *